(12) United States Patent
Fiorentino et al.

(10) Patent No.: US 7,849,122 B2
(45) Date of Patent: Dec. 7, 2010

(54) SELF-AUTHENTICATING QUANTUM RANDOM BIT GENERATORS

(75) Inventors: Marco Fiorentino, Mountain View, CA (US); Raymond G. Beausoleil, Redmond, VA (US); Sean M. Spillane, Mountain View, CA (US); Robert Newton Bicknell, Corvallis, OR (US)

(73) Assignee: Hewlett-Packard Developmemt Company, L.P., Houston, TX (US)

( * ) Notice: Subject to any disclaimer, the term of this patent is extended or adjusted under 35 U.S.C. 154(b) by 902 days.

(21) Appl. No.: 11/787,903

(22) Filed: Apr. 18, 2007

(65) Prior Publication Data

US 2008/0147759 A1   Jun. 19, 2008

Related U.S. Application Data

(63) Continuation-in-part of application No. 11/546,158, filed on Oct. 10, 2006, and a continuation-in-part of application No. 11/407,513, filed on Apr. 20, 2006.

(51) Int. Cl.
*G06F 7/58* (2006.01)
(52) U.S. Cl. .................................... 708/256
(58) Field of Classification Search .......... 708/250–256
See application file for complete search history.

(56) References Cited

U.S. PATENT DOCUMENTS 7,428,562 B2 *   9/2008   Beausoleil et al. .......... 708/255
7,471,793 B2 * 12/2008   Bonfrate et al. ............. 380/256

FOREIGN PATENT DOCUMENTS

WO   WO 99/39434   8/1999

OTHER PUBLICATIONS

Li Y et al—"Parallel Optical Generation of the Binomial Probability Functions"—Optics Communications vol. 71 No. 3/4 May 5, 1989—pp. 161-164.
James D F V et al—"Measurement of Qubits"—Physical Review A vol. 64 No. 5 Nov. 2001—pp. 052312/1-15.
Ma Hai-Qiang et al—A Random Number Genertor Based on Quantum Entangled Photon Pairs—Chinese Physics Letters vol. 21 No. 10 Oct. 1, 2004—pp. 1961-1964.
Hewlett-Packard Development Company, L.P., EP 07755826.0-1229 (co-pending application), Nov. 25, 2009 examinatin report issued by EPO.
Hewlett-Packard Development Company, L.P., KR 2008-7026289 (co-pending application), English Translation of Jan. 6, 2010 Notice of Preliminary Rejection issued by KIPO.

* cited by examiner

*Primary Examiner*—Tan V Mai

(57) ABSTRACT

Various embodiments of the present invention are directed to self-authenticating, quantum random bit generators that can be integrated into an optoelectronic circuit. In one embodiment, a quantum random bit generator comprises a transmission layer that includes an electromagnetic radiation source coupled to a waveguide branching into a first, second, and third waveguides. The radiation source generates pulses of electromagnetic radiation in a first polarization state. Polarization rotators are operably coupled to the second and third waveguides and rotate pulses transmitted in the second waveguide into a second polarization state and rotate pulses transmitted in the third waveguide into a third polarization state. The system control generates a sequence of bits based on polarization basis states of the pulses transmitted in the first waveguide, and tomographically authenticates randomness of the sequence based on polarization basis states of the second and third pulses.

20 Claims, 22 Drawing Sheets

2

SELF-AUTHENTICATING QUANTUM RANDOM BIT GENERATORS

CROSS-REFERENCES TO RELATED APPLICATIONS

This application is a continuation-in-part to application Ser. No. 11/407,513, filed Apr. 20, 2006 and application Ser. No. 11/546,158 filed Oct. 10, 2006.

TECHNICAL FIELD

The present invention relates to random number generators, and, in particular, to methods and systems for generating a sequence of random bits using quantum mechanical properties of quantum systems.

BACKGROUND OF THE INVENTION

Random numbers have applications in numerous areas including game playing, statistical sampling, evaluating integral equations, particle transport calculations, and computations in statistical physics, just to name a few. As a result, random number generators ("RNGs") figure prominently in methods and systems that use random numbers. For example, RNGs are key components of secure systems and are used extensively to generate keys for cryptography. An ideal RNG generates numbers which cannot be predicted in advance, cannot be reliably reproduced, and are distributed according to a uniform distribution. In other words, RNGs ideally generate a sequence of unbiased random numbers. However, many commonly used RNGs either generate sequences of seemingly random numbers or may be susceptible to generating biased sequences of numbers.

RNGs have been implemented in software to generate sequences of seemingly random numbers using formulas and numerical methods. Software-based RNGs are in general formula-based RNGs and are referred to as "pseudorandom number generators" because the formulas allow for prediction and reproduction of a sequence of pseudorandom numbers, provided the same initial parameters are used. A recursive Lehmer pseudorandom number generator ("LPNG") is an example of a commonly used pseudorandom number generator is given by:

$$x_{n+1} = Ax_n + C \pmod{M}$$

where $x_n$ is the nth number of a sequence of random numbers; and

A, C, and M are parameters that can be adjusted to ensure that a sequence of numbers generated by the LPNG appears random.

Typically, M is assigned the word size of a computer employed to compute a sequence of pseudorandom numbers, and $x_0$, the seed, is assigned a prime number. For example, assigning A, C, and M the values 21, 1, and 32 (5 bits), respectively, and assigning $x_0$ the prime number 13, the LPNG generates the following sequence of pseudorandom integers: 13, 18, 27, 24, 25, 14, 7, etc. Alternative approaches may seed a pseudorandom number generator with the time produced by a computer-system clock each time the pseudorandom number generator is initiated. However, even using the time provided by a system clock is not infallible because one may be able to determine the time when the pseudorandom number generator was initiated.

Hardware-based RNGs have also been developed to generate sequences of random numbers based on chaotic fluctuations observed in thermal noise generated by atomic, molecular, and electrical systems. For example, thermal noise generated by an electric current flowing through a resistor can be used as a source of a sequence of random numbers by assigning numbers to the magnitude of voltage equilibrium fluctuations. However, hardware-based RNGs are not always reliable because the systems employed are susceptible to environmental changes. For example, an electric noise-based RNG can be biased by changing the temperature of the system. In addition, the methods typically employed to authenticate the randomness of a sequence generated by a hardware-based RNG are deterministic software-based methods, which can be used to determine whether the sequence is statistically well-behaved but cannot be used to evaluate the true randomness of the sequence. Further, sufficiently powerful data processing systems with appropriate models or algorithms may become able to predict chaotic or thermal processes, even if only for a short time.

Quantum random bit generators ("QRBGs") are another type of hardware-based RNG. A bit is the most basic unit of information used in computing and information processing and exists in one of two states represented by binary numbers "0" and "1." QRBGs are based on quantum-mechanical properties of substantially identical quantum systems. A sequence of random numbers can be generated by associating each number with the outcome of a measurement performed on a quantum system. The numbers generated in this manner are truly random because each measurement projects the state of a quantum system onto one of many possible states at the time the measurement is performed, and, according to the standard interpretation of quantum mechanics, no amount of refinement of the measurement methods and measuring devices can overcome the uncertainty in the outcome of a measurement performed on a quantum system. As a result, QRBGs are highly desirable systems for generating sequences of random numbers.

Quantum measurements can be used to generate random bits. For example, a sequence of random bits can be generated by detecting the transmission and reflection of a 45°-polarized photon on a polarizing beamsplitter with two photomultiplier detectors located in the output channels of a polarizing beamsplitter. Each detector has the same probability of registering a detection event, but one cannot predict which detector records the next detection event. By assigning the binary number "0" to a detection at one of the detectors and the binary number "1" to a detection at the other detector, a sequence of random binary numbers can be constructed. A sequence of bits can be used to generate a sequence of random integers. For example, suppose separately transmitting 30 45°-polarized photons to a polarizing beamsplitter generates the following sequence of random bits:

000110101011100101010111100100

This sequence can be partitioned into 5-bit words to give a sequence of random base 2 numbers 00011, 01010, 11100, 10101, 01111, and 00100, which can then be translated into a corresponding sequence of random base 10 integers 3, 10, 28, 21, 15, and 4, respectively.

Although QRBGs appear to offer a convenient method and system for generating a sequence of random numbers, the QRBGs may be susceptible to generating sequences of biased bits by tampering with the photon source. In addition, methods typically employed to authenticate the randomness of bit sequences generated by QRBGs are deterministic software-based methods, which are unreliable for assessing whether or not a sequence of bits is truly random. Physicists, cryptographers, computer scientists, and quantum-information users have recognized a need for QRBGs that can be used to reliably generate sequences of random bits, can be integrated into optoelectronic devices, and can also detect, authenticate, and correct biases in the sequences of random bits using methods that rely on the non-deterministic properties of quantum systems.

SUMMARY OF THE INVENTION

Various embodiments of the present invention are directed to self-authenticating, quantum random bit generators that can be integrated into an optoelectronic circuit. In one embodiment of the present invention, a self-authenticating, quantum random bit generator comprises a transmission layer and a system control. The transmission layer includes an electromagnetic radiation source coupled to a waveguide branching into a first waveguide, a second waveguide, and a third waveguide. The electromagnetic radiation source is also configured to generate pulses of electromagnetic radiation in a first polarization state. One or more polarization rotators are positioned and configured to rotate pulses transmitted in the second waveguide into a second polarization state and rotate pulses transmitted in the third waveguide into a third polarization state. The system control is configured to generate a sequence of bits based on polarization basis states of the pulses transmitted in the first waveguide, and tomographically authenticates randomness of the sequence of bits based on polarization basis states of the pulses transmitted in the second and third waveguides.

DETAILED DESCRIPTION OF THE INVENTION

Figure 1:
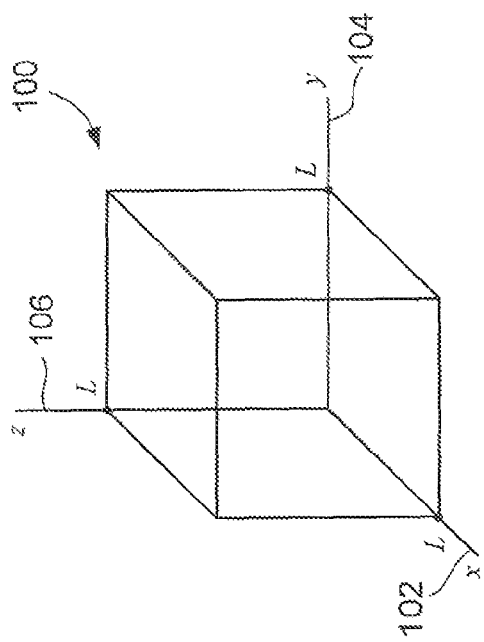
FIG. 1 illustrates a cubic cavity.

Various embodiments of the present invention are directed to self-authenticating quantum random bit generators ("QRBGs") that can be integrated into optoelectronic devices. System embodiments of the present invention generate sequences of random bits and include quantum-mechanical-based methods that can be used to evaluate and authenticate randomness of the sequence and remove biased bits from the sequence. System embodiments are also small enough to be included in optoelectronic devices, such as personal computers, servers, and portable electronic devices, just to name a few.

Embodiments of the present invention are mathematical in nature and, for this reason, are described below with reference to numerous equations and numerous graphical illustrations. Although mathematical expressions, alone, may be sufficient to fully describe and characterize embodiments of the present invention to those skilled in the art of quantum optics and quantum information, the more graphical, problem oriented examples, and control-flow-diagram approaches included in the following discussion are intended to illustrate various embodiments of the present invention in a variety of different ways so that the present invention may be accessible to readers with various backgrounds. Also, in order to assist the reader in understanding descriptions of various embodiments of the present invention, overview subsections of related topics in physics are provided. In a first subsection, an overview of quantum mechanics is provided. An overview of electromagnetic radiation and quantum optics is provided in a second subsection. An overview of coherent states is provided in a third subsection. An overview of polarization states and Stokes parameters is provided in a fourth subsection. Finally, various system and method embodiments of the present invention are described in a fifth subsection.

Overview of Quantum Mechanics

Embodiments of the present invention employ concepts in quantum mechanics. The textbook "Quantum Mechanics, Vol. I and II," by Claude Cohen-Tannoudji, Bernard Diu and Frank Laloe, Hermann, Paris, France, 1977, is one of many references for the field of quantum mechanics. In this subsection, topics in quantum mechanics that relate to embodiments of the present invention are described. Additional details can be obtained from the above-referenced textbook, or from many other textbooks, papers, and journal articles related to quantum mechanics.

Quantum mechanics models the observed behavior, atomic and subatomic levels, of systems comprising photons, electrons, atoms, and molecules. Quantum systems exist in discrete states that are characterized by discrete measurable quantities. A state of a quantum system is represented by a ket and is denoted $|\Psi\rangle$, where $\Psi$ is a label that represents a state of a quantum system. For example, an electron has two intrinsic spin-angular-momentum states that correspond to two measurable spin-angular-momentum values $\hbar/2$ and $-\hbar/2$, where $\hbar$ is approximately $1.0546\times10^{-34}$ Js. The spin state that corresponds to the spin-angular momentum $\hbar/2$ is referred to as "spin up" and can be denoted $|\uparrow\rangle$, and the spin state that corresponds to the spin angular momentum $-\hbar/2$ is referred to as "spin down" and can be denoted $|\downarrow\rangle$. Various different labels can be assigned to various different quantum states. For example, the spin up and spin down states $|\uparrow\rangle$ and $|\downarrow\rangle$ can also be represented by the kets $|½\rangle$ and $|-½\rangle$, respectively. Also, a single label can be used to represent different states in entirely different quantum systems. For example, the ket "$|1\rangle$" can represent a first quantized vibrational level of a diatomic molecule and can also be used to represent a single photon, as described below, in a following subsection.

A measurement employed to determine a measurable quantity of a quantum system is represented by an operator $\hat{\Psi}$, where the symbol "^" denotes an operator. In general, an operator operates on a ket from the left as follows:

$$\hat{\Psi}(|\Psi\rangle) = \hat{\Psi}|\Psi\rangle$$

where $\hat{\Psi}|\Psi\rangle$ is a ket representing an observed quantum state. Typically, an operator $\hat{\Psi}$ is associated with a set of states called "eigenstates." An eigenstate is represented as "$|\psi_i\rangle$" with the following property:

$$\hat{\Psi}|\psi_i\rangle = \psi_i|\psi_i\rangle$$

where i is a non-negative integer; and $\psi_i$ is a real value, called an "eigenvalue," that corresponds to a discrete real-valued measurable quantity that is observed when the quantum system is in the eigenstate $|\psi_i\rangle$. For example, a measurement employed to determine the spin angular momentum of an electron parallel to the z-axis is represented by $\hat{S}_z$, and the eigenvalue-eigenstate representations of observed spin-angular-momentum values are:

$$\hat{S}_z|\uparrow\rangle = \frac{\hbar}{2}|\uparrow\rangle, \text{ and}$$

$$\hat{S}_z|\downarrow\rangle = -\frac{\hbar}{2}|\downarrow\rangle$$

The eigenstates of an operator are complex vectors that span a complex vector space called a "state space." The eigenstates constitute a basis of the vector space if every state belonging to the state space has a unique linear superposition on the basis. For example, a state $|\uparrow\rangle$ in a state space spanned by the N eigenstates $\{|\psi_i\rangle\}$ of an operator $\hat{\Psi}$ the can be written as a linear superposition of the eigenstates as follows:

$$|\Psi\rangle = \sum_{i=1}^{N} c_i |\psi_i\rangle$$

where $c_i$ is a complex valued coefficient called the "amplitude." The state space associated with an operator is also called a "Hilbert space." A Hilbert space includes a mathematical operation called the "inner product." The inner product of two states $|\uparrow\rangle$ and $|\Xi\rangle$ is represented by:

$$\langle\Xi|\Psi\rangle$$

where $\langle\Xi|$ is called a "bra," and represents the complex conjugate and transpose of the state $|\Xi\rangle$. The inner product has the following property:

$$\langle\Xi|\Psi\rangle = \langle\Psi|\Xi\rangle^*$$

where "*" represents the complex conjugate. The basis eigenstates of a Hilbert space are orthonormal, or in mathematical notation:

$$\langle\psi_i|\psi_j\rangle = \delta_{ij}$$

where $\delta_{ij}$ is 1 when i equals j, and 0 otherwise. For example, the inner product of the eigenstates of a single electron Hilbert space are:

$$\langle\uparrow|\uparrow\rangle = \langle\downarrow|\downarrow\rangle = 1, \text{ and}$$

$$\langle\uparrow|\downarrow\rangle = \langle\downarrow|\uparrow\rangle = 0$$

The orthonormality property of the eigenstates of a Hilbert space can be used to determine the coefficients of the linear superposition of states $|\Psi\rangle$. Taking the inner product of $|\Psi\rangle$ with $\langle\psi_j|$ gives the corresponding coefficient:

$$\langle\psi_j|\Psi\rangle = \sum_{i=1}^{N} c_i \langle\psi_j|\psi_i\rangle = \sum_{i=1}^{N} c_i \delta_{ij} = c_j$$

Substituting for the coefficients in the linear superposition gives:

$$|\Psi\rangle = \sum_{i=1}^{N} |\psi_i\rangle\langle\psi_i|\Psi\rangle$$

Because $|\Psi\rangle$ is an arbitrary ket in the Hilbert space, $$\sum_{i=1}^{N} |\psi_i\rangle\langle\psi_i| = \hat{1}$$

where "$\hat{1}$" is the identity operator. The summation is called the "completeness relation," and the eigenstates $\{|\psi_i\rangle\}$ are said to be "complete."

Prior to a measurement corresponding to an operator $\hat{\Psi}$, a quantum system can be thought of as simultaneously existing in all of the eigenstates $\{|\psi_i\rangle\}$ of the operator $\hat{\Psi}$, which is represented by the (pure state) linear superposition of states:

$$|\Psi\rangle = \sum_{i=1}^{N} c_i |\psi_i\rangle = \sum_{i=1}^{N} |\psi_i\rangle\langle\psi_i|\Psi\rangle$$

The measurement corresponding to the operator $\hat{\Psi}$ projects the quantum system initially in the state $|\Psi\rangle$ onto one of the eigenstates $|\psi_i\rangle$. In other words, a measurement on a quantum system is essentially a filtering process that places the state of the quantum system into one of the eigenstates in the linear superposition at the time of the measurement. For example, an electron with an unknown spin orientation prior to a measurement corresponding to the operator $\hat{S}_z$ is represented in a linear superposition of states:

$$|\Psi\rangle = c_1|\uparrow\rangle + c_2|\downarrow\rangle$$

A spin determination measurement $\hat{S}_z$ projects the state of the electron onto either the state $|\uparrow\rangle$ or the state $|\downarrow\rangle$ at the time of the measurement. In other words, just after the spin determination measurement, the electron is either in the state $|\uparrow\rangle$ or the state $|\downarrow\rangle$.

There is a corresponding irreversible change in the state of a quantum system as a result of a measurement. Irreversibility can only be avoided when the quantum system is already in one of the quantum states before the measurement is performed. As a result, one cannot infer the prior state of a quantum system based on the outcome of a single measurement. For example, if the outcome of a spin measurement is $\hbar/2$, it is not possible to determine whether the system was already in the state $|\uparrow\rangle$ or in a linear superposition of the spin states $|\uparrow\rangle$ and $|\downarrow\rangle$ at the time of the measurement.

Although it is not possible to know in advance which of the various states $|\psi_i\rangle$ the state of a quantum system will be projected onto, the probability of the quantum system being found in a particular state $|\psi_i\rangle$ immediately after the measurement is given by:

$$Pr(\psi_i) = |c_i|^2 = |\langle\psi_i|\Psi\rangle|^2$$

where $|\Psi\rangle$ is normalized, and $|c_i|^2$ equals $c_i^* c_i$ and gives the outcome probability. For example, prior to a spin determination measurement in the spin basis $\{|\uparrow\rangle, |\downarrow\rangle\}$, consider an electron coherently prepared with a ½ probability of being found in the spin state $|\uparrow\rangle$ and a ½ probability of being found in the spin state $|\downarrow\rangle$. The state associated with the electron in such as spin state prior to a spin determination measurement can be represented by:

$$|\Psi\rangle = \frac{1}{\sqrt{2}}|\uparrow\rangle + \frac{1}{\sqrt{2}}|\downarrow\rangle$$

The expectation value of a measurement performed on a quantum system that is represented by the linear superposition of states $|\Psi\rangle$ is mathematically represented by:

$$\langle\hat{\Psi}\rangle = \langle\Psi|\hat{\Psi}|\Psi\rangle$$

and is determined by applying the completeness relation as follows:

$$\langle\hat{\Psi}\rangle = \sum_{i=1}^{N}\sum_{j=1}^{N} \langle\Psi|\psi_i\rangle\langle\psi_i|\hat{\Psi}|\psi_j\rangle\langle\psi_j|\Psi\rangle$$

-continued $$= \sum_{i=1}^{N} \psi_i |\langle\psi_i|\Psi\rangle|^2$$

The expectation value represents the weighted eigenvalue average result expected from measurements on the quantum systems in the ensemble, where the initial state $|\Psi\rangle$ of the quantum system is the same for each member of the ensemble. In other words, the linear superposition of states representing each quantum system is identical prior to the measurement. In practice, such an ensemble could be realized by preparing many identical and independent quantum systems all in the same state, or by repeatedly preparing a single system in the same state. Note that the expectation value may not be the value obtained for each measurement and, therefore, is not to be confused with the eigenvalue obtained from the measurement. For example, the expectation value of $\hat{S}_z$ can be any real value between the eigenvalues $\hbar/2$ and $-\hbar/2$, but the actual measured value of $\hat{S}_z$ for an electron is always either $\hbar/2$ or $-\hbar/2$ in each individual measurement.

The expectation value of a single quantum system in a state $|\Psi\rangle$ can also be described using a density operator defined by:

$$\hat{\rho} = |\Psi\rangle\langle\Psi|$$

where the state $|\Psi\rangle$ is also called a "pure state," which is distinguished from a statistical mixture of states described below. The density operator is represented in the $\{|\psi_i\rangle\}$ basis by a matrix called the "density matrix" whose matrix elements are:

$$\rho_{ij} = \langle\psi_i|\hat{\rho}|\psi_j\rangle = c_i^* c_j$$

The density operator characterizes the state of the quantum system. In other words, the density operator provides all the physical information that can be calculated from the state $|\Psi\rangle$. For example, the sum of the diagonal matrix elements of the density matrix is given by:

$$\sum_i |c_i|^2 = \sum_i \rho_{ii} = Tr(\rho) = 1$$

where Tr represents the trace, or sum of the diagonal elements, of a matrix. For example, the density matrix of a two-state quantum system in the pure state:

$$|\Psi\rangle = c_1|\psi_1\rangle + c_2|\psi_2\rangle$$

is given by:

$$\rho = \begin{bmatrix} c_1 c_1^* & c_1 c_2^* \\ c_2 c_1^* & c_2 c_2^* \end{bmatrix}$$

where the diagonal elements are the probabilities associated with projecting the quantum system into either the state $|\psi_1\rangle$ or the state $|\psi_2\rangle$, and the off-diagonal elements represent the interference effects between the states $|\psi_1\rangle$ and $|\psi_2\rangle$. In addition, the expectation value of a quantum system in the state $|\Psi\rangle$ can be expressed as:

$$\langle \hat{\Psi} \rangle = \sum_{i,j} \langle \psi_j | \Psi \rangle \langle \Psi | \psi_i \rangle \langle \psi_i | \hat{\Psi} | \psi_j \rangle$$

$$= \sum_{i,j} \langle \psi_j | \hat{\rho} | \psi_i \rangle \langle \psi_i | \hat{\Psi} | \psi_j \rangle$$

$$= Tr\{\hat{\rho}\hat{\Psi}\}$$

However, it is often the case that information about a quantum system is incomplete. For example, a quantum system can be in any one of the states $|\Psi_1\rangle, |\Psi_2\rangle, |\Psi_3\rangle, \ldots$, each with an associated probability $p_1, p_2, p_3, \ldots$, where the probabilities satisfy the conditions:

$$0 \leq p_1, p_2, p_3, \ldots \leq 1, \text{ and } \sum_i p_i = 1$$

The quantum system is said to exist in a "statistical mixture of states." The density operator for a statistical mixture of states can be determined as follows. As described above, the probability that a measurement of the observable $\hat{\Psi}$ on a quantum system in the pure state $|\Psi_i\rangle$ yields a result $\psi_n$ is:

$$Pr_i(\psi_n) = \langle \Psi_i | \psi_n \rangle \langle \psi_n | \Psi_i \rangle = |\langle \psi_n | \Psi_i \rangle|^2$$

However, the probability $Pr_i(\psi_n)$ of observing $\psi_n$ in a statistical mixture of states is weighted by $p_i$ and the summed over i to give:

$$Pr(\psi_n) = \sum_i p_i Pr_i(\psi_n)$$

$$= \sum_i p_i \langle \psi_n | \Psi_i \rangle \langle \Psi_i | \psi_n \rangle$$

$$= \langle \psi_n | \hat{\rho} | \psi_n \rangle \text{ where}$$

$$\hat{\rho} = \sum_i p_i |\Psi_i\rangle \langle \Psi_i|$$

is the density operator associated with a statistical mixture of states. The associated density matrix elements are given by:

$$\rho_{np} = \left\langle \psi_n \left| \sum_i p_i |\Psi_i\rangle \langle \Psi_i| \right| \psi_p \right\rangle$$

$$= \sum_i p_i c_n^{(i)} c_p^{(i)*}$$

The physical meaning of the density matrix is described for a two-state quantum system comprising a mixture of states:

$$|\Psi_i\rangle = c_1^{(i)}|\psi_1\rangle + c_2^{(i)}|\psi_2\rangle$$

The corresponding density matrix is given by:

$$\rho = \begin{bmatrix} \rho_{11} & \rho_{12} \\ \rho_{21} & \rho_{22} \end{bmatrix} = \begin{bmatrix} \sum_i p_i c_1^{(i)} c_1^{(i)*} & \sum_i p_i c_1^{(i)} c_2^{(i)*} \\ \sum_i p_i c_2^{(i)} c_1^{(i)*} & \sum_i p_i c_2^{(i)} c_2^{(i)*} \end{bmatrix}$$

The diagonal matrix elements can be interpreted to mean that when the state of the quantum system is $|\Psi_i\rangle$, the diagonal matrix element $\rho_{11}$ represents the average probability of finding the quantum system in the state $|\psi_1\rangle$, and the diagonal matrix element $\rho_{22}$ represents the average probability of finding the quantum system in the state $|\psi_2\rangle$. When the same measurement is carried out N times under identical conditions, $N\rho_{11}$ will be found in the state $|\psi_1\rangle$ and $N\rho_{22}$ will be found in the state $|\psi_2\rangle$. The off-diagonal elements $\rho_{12}$ and $\rho_{21}$ express the average interference effects between the states $|\psi_1\rangle$ and $|\psi_2\rangle$. Note that unlike the diagonal matrix elements, the off-diagonal matrix elements can be zero even though neither of the products $c_1^{(i)} c_2^{(i)*}$ and $c_2^{(i)} c_1^{(i)*}$ is zero, which means that the average over N measurements has cancelled out the interference effects of the states $|\psi_1\rangle$ and $|\psi_2\rangle$.

A tensor product is a way of combining Hilbert spaces of different quantum systems to form Hilbert spaces that represent combined quantum systems. For example, $H_\Psi$ is a Hilbert space of a first quantum system, and $H_\Xi$ is a Hilbert space of a second quantum system. The Hilbert space denoted by $H_\Psi \otimes H_\Xi$ represents a combined Hilbert space, where the symbol $\otimes$ represents a tensor product. The operators $\hat{\Psi}$ and $\hat{\Xi}$ correspond to the Hilbert spaces $H_\Psi$ and $H_\Xi$, respectively, and each operates only on the corresponding eigenstates as follows:

$$(\hat{\Psi} \otimes \hat{\Xi})(|\psi\rangle \otimes |\xi\rangle) = (\hat{\Psi}|\psi\rangle) \otimes (\hat{\Xi}|\xi\rangle)$$

where $|\psi\rangle$ represents a state in the Hilbert space $H_\Psi$, and $|\xi\rangle$ represents a state in the Hilbert space $H_\Xi$. The tensor product $|\psi\rangle \otimes |\xi\rangle$ can be abbreviated as $|\psi\rangle|\xi\rangle$, $|\psi,\xi\rangle$, or $|\psi\xi\rangle$. For example, the spin states of two electrons in an atomic orbital are bases for a combined Hilbert space. The two electrons can either both be spin up, both be spin down, the first electron spin up and the second electron spin down, or the first electron spin down and the second electron spin up. The various tensor product representations of two spin up electrons are given by:

$$|\uparrow\rangle_1 \otimes |\uparrow\rangle_2 = |\uparrow\rangle_1|\uparrow\rangle_2 = |\uparrow,\uparrow\rangle_{12} = |\uparrow\uparrow\rangle_{12}$$

where the subscripts 1 and 2 refer to the first and second electrons.

An Overview of Electromagnetic Radiation and Quantum Optics

In this subsection, a brief description of electromagnetic radiation and quantum optics that relates to embodiments of the present invention is described. Quantum optics is a field of physics that relates the application of quantum mechanics to electromagnetic radiation. Electromagnetic radiation confined to a cavity with perfectly reflecting walls is quantized. Quantized electromagnetic radiation can be applied to more general unconfined optical systems, such as electromagnetic radiation propagating in free space or in an optical fiber.

Electromagnetic radiation confined to a cavity, with no free charges and currents, comprises an electric field component $\vec{E}(\vec{r},t)$ and a magnetic field component $\vec{B}(\vec{r},t)$ that are related in terms of a vector potential $\vec{A}(\vec{r},t)$ satisfying the wave equation:

$$\nabla^2 \vec{A} - \frac{1}{c^2} \frac{\partial^2 \vec{A}}{\partial t^2} = 0$$

and the Coulomb, non-relativistic gauge condition:

$$\nabla \cdot \vec{A}(\vec{r},t) = 0$$

where the electric and magnetic field components are determined by:

$$\vec{E}(\vec{r},t) = -\frac{\partial \vec{A}(\vec{r},t)}{\partial t}, \text{ and}$$

$$\vec{B}(\vec{r},t) = \nabla \times \vec{A}(\vec{r},t)$$

The electromagnetic radiation is assumed to be propagating and is subject to periodic boundary conditions imposed by a cubic, or quantization, cavity with perfectly reflecting walls, where the walls are of length L. FIG. 1 illustrates a cubic cavity 100. Orthogonal axes 102, 104, and 106 represent the x, y, and z Cartesian coordinate axes. The finite dimensional cubic cavity 100 imposes periodic boundary conditions on solutions to the wave equation. For example, in the x, y, and z-directions, plane wave solutions to the vector potential wave equation satisfy the condition:

$$\exp(i\vec{k}\cdot\vec{r}) = \exp(i\vec{k}\cdot(\vec{r}+\vec{L}))$$

where $\vec{L}$ is vector (L, L, L), and $\vec{k}$ is called the "wavevector" with components:

$$\vec{k} = \frac{2\pi}{L}(m_x, m_y, m_z),$$

and $m_x$, $m_y$, and $m_z$ are integers.

Each set of integers ($m_x$, $m_y$, $m_z$) specifies a normal mode of the electromagnetic radiation, and the magnitude of the wavevector $\vec{k}$, is called the wavenumber, k, and is equal to $\omega_k/c$, where c represents the speed of light in free space and $\omega_k$ is the angular frequency. Note that in real life the spectrum of normal modes of an electromagnetic field is actually continuous and a discrete spectrum of normal modes suggested by the wavevector $\vec{k}$ is an approximation to the continuous spectrum.

A propagating vector potential solution to the wave equation above that satisfies the periodic boundary conditions is:

$$A(r,t) = \sum_{\vec{k},s} \vec{e}_{\vec{k}s}\left(A_{\vec{k}s}e^{i(\vec{k}\cdot\vec{r}-\omega_k t)} + A^*_{\vec{k}s}e^{-i(\vec{k}\cdot\vec{r}-\omega_k t)}\right)$$

where $A_{\vec{k}s}$ is a complex amplitude of the electromagnetic radiation;

$\vec{e}_{\vec{k}s}$ represents two unit-length polarization vectors; and $m_x$, $m_y$, $m_z$ = 0, ±1, ±2, ±3, . . . .

The sum over $\vec{k}$ represents the sum over the integers ($m_x$, $m_y$, $m_z$), and the sum over s is the sum over the two independent polarizations that are associated with each $\vec{k}$. The two polarization vectors are orthogonal as indicated by:

$$\vec{e}_{\vec{k}s}\cdot\vec{e}_{\vec{k}s'} = \delta_{ss'},$$

and from the gauge condition given above:

$$\vec{k}\cdot\vec{e}_{\vec{k}s} = 0,$$

for both polarization directions s. The two polarization vectors $\vec{e}_{\vec{k}1}$ and $\vec{e}_{\vec{k}2}$ form a right-handed coordinate system with a normalized wavevector given by:

$$\vec{e}_{\vec{k}1} \times \vec{e}_{\vec{k}2} = \frac{\vec{k}}{|\vec{k}|} = \vec{\kappa}$$

Figure 2:
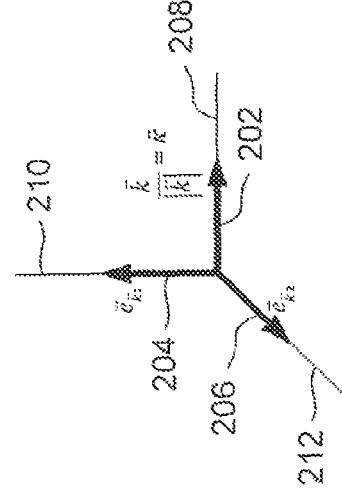
FIG. 2 illustrates a three-dimensional coordinate system with two independent polarization vectors and a normalized wavevector as basis vectors.

FIG. 2 illustrates a three-dimensional right-handed coordinate system with two independent polarization vectors $\vec{e}_{\vec{k}s}$ and a normalized wavevector $\vec{\kappa}$ as basis vectors. In FIG. 2, the wavevector $\vec{\kappa}$ 202, and the polarization vectors, $\vec{e}_{\vec{k}1}$ 204 and $\vec{e}_{\vec{k}2}$ 206, define three orthogonal unit length basis vectors of a coordinate system with coordinate axes represented by lines 208, 210, and 212, respectively.

The propagating electric and magnetic field components of the vector potential are:

$$\vec{E}(\vec{r},t) = i\sum_{\vec{k},s}\omega_k\vec{e}_{\vec{k}s}\left[A_{\vec{k}s}e^{i(\vec{k}\cdot\vec{r}-\omega_k t)} - A^*_{\vec{k}s}e^{-i(\vec{k}\cdot\vec{r}-\omega_k t)}\right], \text{ and}$$

$$\vec{B}(\vec{r},t) = \frac{i}{c}\sum_{\vec{k},s}\omega_k(\vec{\kappa}\times\vec{e}_{\vec{k}s})\left[A_{\vec{k}s}e^{i(\vec{k}\cdot\vec{r}-\omega_k t)} - A^*_{\vec{k}s}e^{-i(\vec{k}\cdot\vec{r}-\omega_k t)}\right]$$

Both the electric field $\vec{E}(\vec{r},t)$ and magnetic field $\vec{B}(\vec{r},t)$ are propagating wave solutions referred to as the "classical" representation of the electric and magnetic field, are orthogonal to one another, and are both orthogonal to the wavevector $\vec{k}$.

Note that the wavevector $\vec{k}$ and the polarization parameter s define what is called a "spatial mode" or "mode" of the electromagnetic radiation field.

Figure 3:
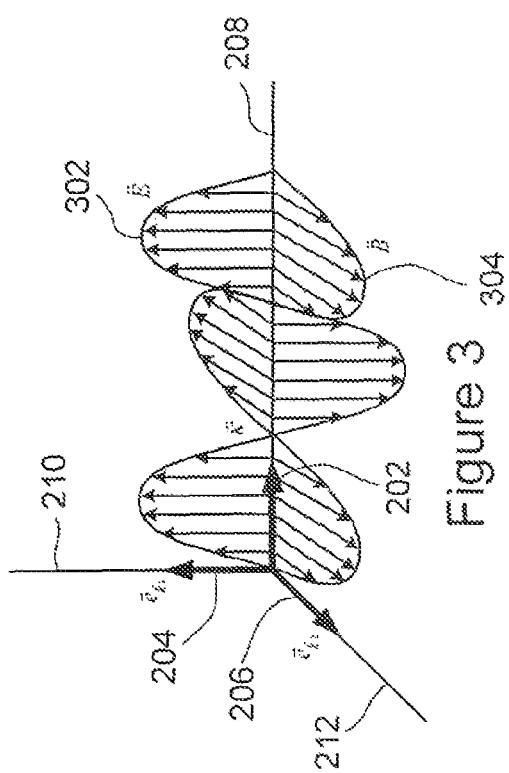
FIG. 3 illustrates a representation of electric and magnetic field components of an electromagnetic wave in the coordinate system shown in FIG. 2.

FIG. 3 illustrates a representation of electric and magnetic field components of electromagnetic radiation in the right-handed coordinate system shown in FIG. 2. The electromagnetic radiation is directed along the wavevector $\vec{\kappa}$ 202 axis. The electric field component $\vec{E}(\vec{r},t)$ 302 and magnetic field component $\vec{B}(\vec{r},t)$ 304 are directed along the orthogonal polarization vectors $\vec{e}_{\vec{k}1}$ 204 and $\vec{e}_{\vec{k}2}$ 206, respectively, and appear frozen at a particular time t.

The energy of the electromagnetic radiation can be determined by evaluating the Hamiltonian:

$$H = \frac{1}{2}\int_V\left(\varepsilon_0\vec{E}\cdot\vec{E} + \frac{1}{\mu_0}\vec{B}\cdot\vec{B}\right)dV$$

$$= 2\varepsilon_0 V\sum_{\vec{k},s}\omega_k^2 A_{\vec{k}s}A^*_{\vec{k}s},$$

where $\varepsilon_0$ is the electric permittivity of free space;
$\mu_0$ is the magnetic permeability of free space; and
V is the volume of the cavity.

The electric permittivity $\varepsilon_0$ represents the degree to which a vacuum space can store electrical potential energy under the influence of an electric field, and the magnetic permeability $\mu_0$ represents the degree to which the vacuum modifies the flux of a magnetic field. In a dielectric medium, the electric permittivity is further multiplied by a dielectric constant $\in$, which is the degree to which the medium enhances the storage of electrical potential energy, and the magnetic permeability is further multiplied by $\mu$, which is the degree to which the medium further enhances the flux of a magnetic field.

The quantum Hamiltonian operator is given by:

$$\hat{H} = \sum_{\vec{k},s} \hbar \omega_k \left( \hat{a}^\dagger_{\vec{k}s} \hat{a}_{\vec{k}s} + \frac{1}{2} \right),$$

where $\hat{a}_{\vec{k}s}$ is called the "annihilation operator;"

$\hat{a}_{\vec{k}s}^\dagger$ is called the "creation operator;" and $\hat{a}_{\vec{k}s}^\dagger \hat{a}_{\vec{k}s}$ is called the "number operator" and is also denoted by $\hat{n}_{\vec{k}s}$.

When the electromagnetic field is quantized, the amplitudes $A_{\vec{k}s}$ are given by the operators:

$$\hat{A}_{\vec{k}s} = \sqrt{\frac{\hbar}{2\omega_k \varepsilon_0 V}} \hat{a}_{\vec{k}s},$$

which can be substituted in the classical electric and magnetic field equations above to obtain electric and magnetic field operators:

$$\hat{E}(\vec{r},t) = i \sum_{\vec{k},s} \sqrt{\frac{\hbar \omega}{2\varepsilon_0 V}} e_{\vec{k}s} [\hat{a}_{\vec{k}s} e^{i(k \cdot r - \omega_k t)} - \hat{a}^\dagger_{\vec{k}s} e^{-i(k \cdot r - \omega_k t)}], \text{ and}$$

$$\hat{B}(\vec{r},t) = \frac{i}{c} \sum_{\vec{k},s} (\hat{k} \times e_{\vec{k}s}) \sqrt{\frac{\hbar \omega}{2\varepsilon_0 V}} e_{\vec{k}s} [\hat{a}_{\vec{k}s} e^{i(k \cdot r - \omega_k t)} - \hat{a}^\dagger_{\vec{k}s} e^{-i(k \cdot r - \omega_k t)}]$$

Both the electric and magnetic field operators are Hermitian and represent measurable electric and magnetic fields.

Because the magnitude of the magnetic field is smaller than the electric field by the factor $1/c$, the electric field accounts for most of the interactions with charged matter. As a result, the electric field alone is generally used to characterize the behavior of electromagnetic radiation and any interactions with charged matter, and the magnetic field component can be ignored.

Quantum computation and quantum information processing systems can be performed with a single mode $\vec{k}$s of electromagnetic radiation. As a result, the Hamiltonian operator for a single mode of electromagnetic radiation reduces to:

$$\hat{H} = \hbar \omega \left( \hat{a}^\dagger \hat{a} + \frac{1}{2} \right),$$

where $\hat{a}$ and $\hat{a}^\dagger$ replace the mode-dependent operators $\hat{a}_{\vec{k}_j s_j}$ and $\hat{a}_{\vec{k}_j s_j}^\dagger$ in the Hamiltonian above. The eigenstates and the corresponding energy eigenvalues of the single mode Hamiltonian are:

$$\hat{H} | n \rangle = \hbar \omega \left( \hat{a}^\dagger \hat{a} + \frac{1}{2} \right) | n \rangle = E_n | n \rangle,$$

where $|n\rangle$ is called a "number state," n is a nonnegative integer called the "photon number" representing the number of photons in an electromagnetic field, and $E_n$ is an energy eigenvalue or energy of the electromagnetic field.

The annihilation and creation operators operate on a number state as follows:

$\hat{a}|n\rangle = \sqrt{n}|n-1\rangle,$ $\hat{a}^\dagger|n\rangle = \sqrt{n+1}|n+1\rangle,$ and $\hat{n}|n\rangle = n|n\rangle,$ where $\hat{n}$ represents the operator $\hat{a}^\dagger \hat{a}$ and is called the "number operator." The number states can be generated by repeated application of the annihilation and creation operators to the number states. For example, repeated application of the annihilation operator to a number state lowers the photon number:

$$|0\rangle = \frac{\hat{a}^n}{\sqrt{n!}} |n\rangle,$$

where $|0\rangle$ is called the "vacuum state" and represents the lowest energy state of the electromagnetic radiation. Beginning with the vacuum state, and repeatedly applying the creation operator gives:

$$|n\rangle = \frac{(\hat{a}^\dagger)^n}{\sqrt{n!}} |0\rangle$$

The number states are orthogonal and form a compete set represented by:

$\langle n' | n \rangle = \delta_{n'n},$ and $$\sum_{n=0}^{\infty} |n\rangle \langle n| = 1$$

In general, the energy eigenvalue equation associated with a number state $|n\rangle$ is:

$$\hat{H}|n\rangle = \hbar \omega \left( n + \frac{1}{2} \right) |n\rangle = E_n |n\rangle.$$

Applying the annihilation and creation operators to the energy eigenvalue equation gives:

$$\hat{H}(\hat{a}|n\rangle) = \hbar \omega \left( n - \frac{1}{2} \right) |n-1\rangle = (E_n - \hbar \omega)|n-1\rangle, \text{ and}$$

$$\hat{H}(\hat{a}^\dagger |n\rangle) = \hbar \omega \left( n + \frac{3}{2} \right) |n+1\rangle = (E_n + \hbar \omega)|n+1\rangle,$$

which shows that the energy levels of electromagnetic radiation are equally spaced by a quantum of energy $\hbar\omega$. In other words, the excitations of electromagnetic radiation occur in discrete amounts of energy $\hbar\omega$ called "photons." The photon number n refers to the number of photons $\hbar\omega$ comprising the electromagnetic radiation.

Figure 4:
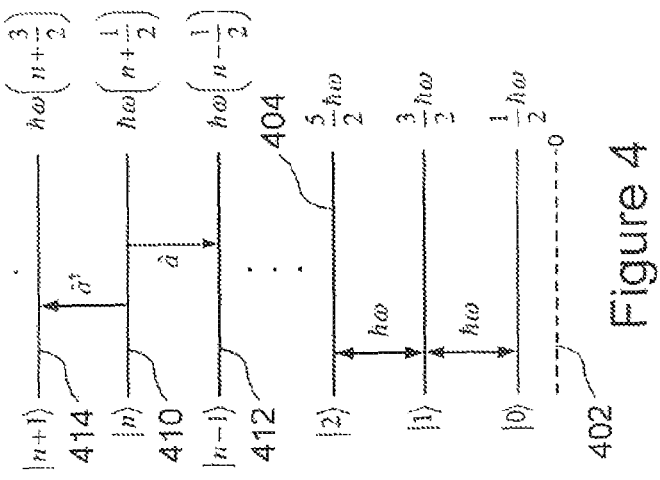
FIG. 4 is an energy-level diagram of quantized electromagnetic radiation.

FIG. 4 is an energy level diagram of a single mode of quantized electromagnetic radiation. Horizontal lines represent energy levels of electromagnetic radiation. Energy level 402 is the lowest energy level, which corresponds to the ground or vacuum state $|0\rangle$. The energy of the vacuum state is $\hbar\omega/2$ or ½ the energy of a single photon $\hbar\omega$. Higher energy levels of electromagnetic radiation are each separated from each other by the same quantum of energy $\hbar\omega$. For example, energy level 404 represents electromagnetic field with a total electromagnetic energy of $5\hbar\omega/2$, which can be thought of as the energy of electromagnetic radiation having two photons plus the vacuum state energy $\hbar\omega/2$. The annihilation operator a corresponds to removal of a photon from the electromagnetic field, and the creation operator $\hat{a}^\dagger$ corresponds to addition of a photon to the electromagnetic radiation. For example, the annihilation operator â represents a energy transition from the state $|n\rangle$ 410 to the lower energy state $|n-1\rangle$ 412. This transition is accomplished by the electromagnetic field giving up a photon to the surroundings. By contrast, the creation operator at represents a transition from the state $|n\rangle$ 410 to the higher energy state $|n+1\rangle$ 414. This transition is accomplished by the electromagnetic field accepting a photon from the surroundings. Note that typically the surroundings can be an atom, a quantum dot, or any other system that couples to the electromagnetic field through a dipole interaction. Loss or absorption of a photon will involve a simultaneous excitation of the surrounding system and creation or emission of a photon will involve a corresponding de-excitation of the surrounding system.

Photons can be generated by a photon source and transmitted through free space or in an optical fiber. The photon source can generate a single short-duration burst of electromagnetic radiation, called a "pulse," or generate a sequence or train of pulses, each pulse containing one or more photons that all have the same electromagnetic properties, such as wavelength, phase, and direction. Photons with the same optical properties are called "coherent." However, the source, a detector, and a medium, such as an optical fiber, separating the source from the detector does not define an optical cavity. The source and the detector are parts of a continuous unidirectional flow of electromagnetic energy with no significant reflection or recycling of the energy. A pulse transmitted through free space or a waveguide can be described by a wavepacket that can be represented by a time-dependent, Gaussian-shaped function given by:

$$\xi(t) = \left(\frac{2\Delta^2}{\pi}\right)^{1/4} \exp\{-i\omega_0 t - \Delta^2(t_0 - t)^2\},$$

where $\omega_0$ is the central frequency of the pulse spectrum, t is time, $t_0$ is the time at which the peak of the wavepacket is located at a distance $z_0$ from the photon source, and $\Delta^2$ is the variance of the intensity spectrum.

The time $t_0$ can be determined by $z_0/v$, where v is the velocity of the pulse traveling through free space or in an optical fiber.

The wavepacket $\xi(t)$ is the amplitude of the pulse, and $|\xi(t)|^2$ is a photodetection probability density function of the pulse, where the photodetection probability density function $|\xi(t)|^2$ satisfies the normalization condition:

$$\int_{-\infty}^{\infty} dt |\xi(t)|^2 = 1$$

The probability of photodetection of a photon in the time interval $(t_1, t_2)$ at a distance $z_0$ from the photon source is given by:

$$\text{Probability of}(t_1 < t_2) = \int_{t_1}^{t_2} dt |\xi(t)|^2$$

Figure 5:
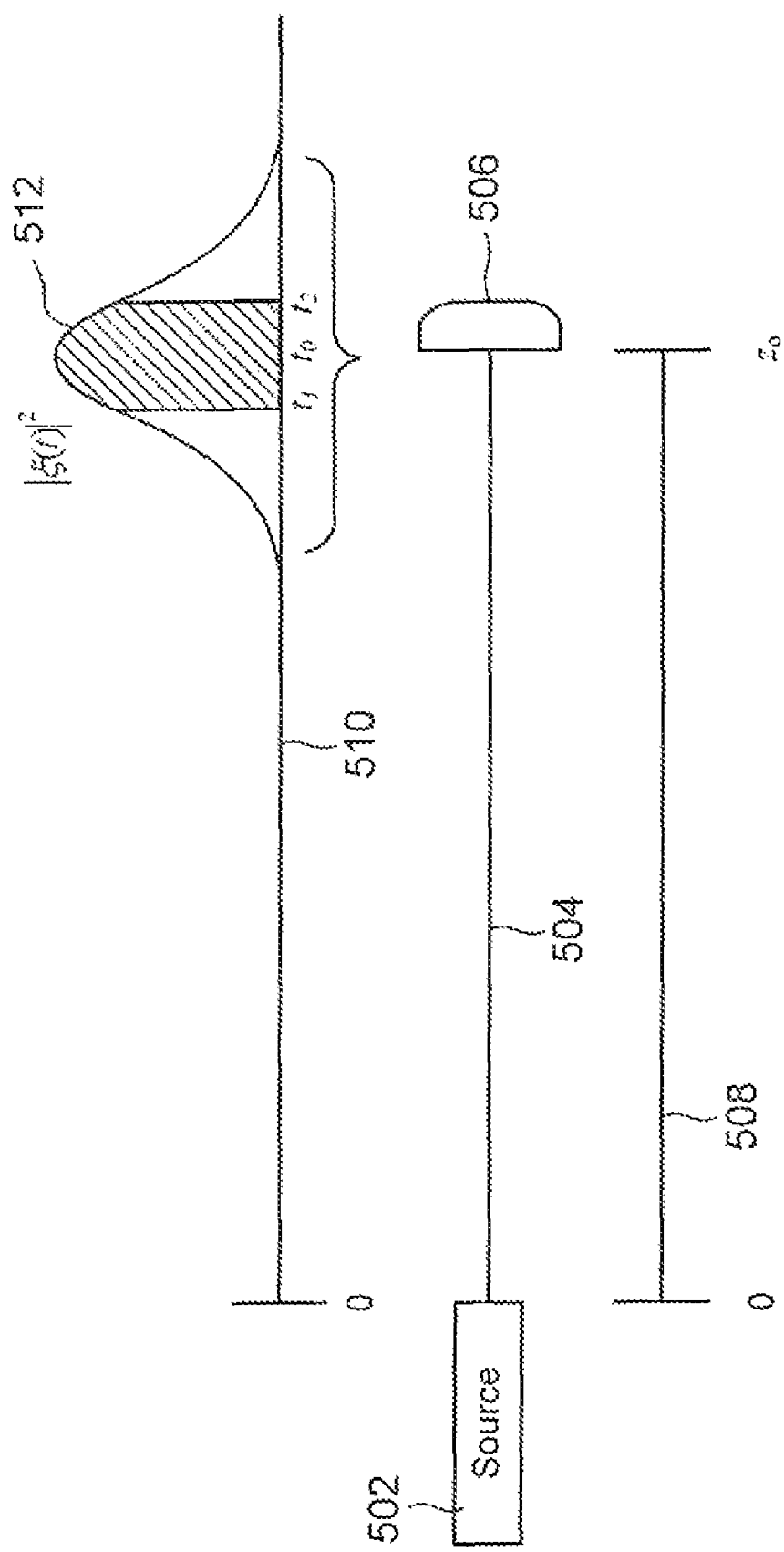
FIG. 5 illustrates a probability distribution associated with a pulse output from a source and transmitted in a waveguide to a detector.

FIG. 5 illustrates a probability distribution associated with a pulse output from a source 502 and transmitted in a waveguide 504 to a detector 506. The horizontal line 508 represents the distance $z_0$ the photon travels from the source 502 to the detector 506, and the horizontal line 510 is a time axis. The curve 512 represents the photodetection probability density function $|\xi(t)|^2$. In FIG. 5, the photodetection probability density function $|\xi(t)|^2$ 512 is centered at the time $t_0$, which corresponds to the average time a pulse takes to travel the distance $z_0$. An area under the curve 512 represents the probability of detecting the pulse within a particular time period. For example, hash-marked region 514 represents the probability of detecting the photon within the time period $t_1 < t_0 < t_2$. Time period 516 is called a "time bin" and corresponds to the time period within which the photon is detected at the detector 506.

An Overview of Coherent States

The most common kind of single-mode states are linear superpositions of the number states. There are a number of different possible linear superpositions of the number states, but the coherent state:

$$|\alpha\rangle = \exp\left(-\frac{1}{2}|\alpha|^2\right) \sum_{n=0}^{\infty} \frac{\alpha^n}{\sqrt{n!}} |n\rangle$$

is a linear superposition of the number states used in many applications of quantized electromagnetic radiation. The coherent states are eigenstates of the annihilation operator:

$$\hat{a}|\alpha\rangle = \alpha|\alpha\rangle$$

where taking the complex conjugate gives:

$$\langle\alpha|\hat{a}^\dagger = \langle\alpha|\alpha^*$$

However, the coherent state $|\alpha\rangle$ is not an eigenstate of the creation operator $\hat{a}^\dagger$ because the summation over a cannot be rearranged to give the coherent state from $\hat{a}^\dagger|\alpha\rangle$.

The coherent state expectation value for the number operator:

$$\langle n \rangle = \langle\alpha|\hat{n}|\alpha\rangle = |\alpha|^2$$

indicates that $|\alpha|^2$ is the mean number of photons. The probability of detecting n photons in a measurement of the number of photons is a Poisson distribution:

$$P_n = |\langle n | \alpha \rangle|^2 = \exp(-|\alpha|^2)\frac{|\alpha|^2}{n!}$$

The Poisson distribution approaches a Gaussian distribution for large values of $|\alpha|^2$.

The coherent state is a quantum state whose properties most closely resemble a classical electromagnetic wave of stable amplitude and fixed phase. For example, the electric field operator corresponding to an electric field propagating in the z direction, with the mode subscripts k and s removed, is:

$$\hat{E}(\Omega) = \frac{1}{2}(\hat{a}e^{-i\Omega} + \hat{a}^\dagger e^{i\Omega})$$
$$= \hat{X}\cos\Omega + \hat{Y}\sin\Omega$$

where the time t and displacement z are contained in the phase angle:

$$\Omega(z, t) = \omega t - kz - \frac{\pi}{2}$$

and the electric field is measured in units of $\sqrt{\hbar\omega/2\epsilon_0 V}$.

The coherent state is a nearly classical state because it gives the correct sinusoidal form for the electric field expectation value or coherent signal:

$$\sum = \langle \alpha | \hat{E}(\Omega) | \alpha \rangle$$
$$= |\alpha|\cos(\Omega - \phi)$$

where $\alpha = |\alpha|e^{i\phi}$, and
$\phi$ is the mean phase angle of the coherent state excitation of the mode.

Polarization States and Stokes Parameters

In this subsection, polarization states of electromagnetic radiation are discussed. As described above with reference to FIG. 3, electromagnetic radiation may be treated as propagating transverse electromagnetic waves. It is the electric field component, alone, that can be used to represent an electromagnetic wave, because the electric field accounts for most of the interactions with charged matter and the magnitude of the magnetic field is smaller than the electric field by the factor 1/c. As shown in FIG. 3, when both the oscillating electric field $\vec{E}(\vec{r},t)$ component and the associated wavevector $\vec{k}$ of an electromagnetic field reside in a plane-of-vibration the field is said to be "linearly polarized." Definite polarization states can be created by transmitting electromagnetic radiation comprising numerous randomly polarized electromagnetic waves through one or more polarizers. Each polarizer is a device that transmits only the electromagnetic waves with electric field components that are aligned with the polarization axis of the polarizer.

Any two orthogonal linear polarization states can be used to define a polarization basis, denoted by $\{|H\rangle, |V\rangle\}$. The first polarization state $|H\rangle$ represents an electromagnetic wave polarized in a first direction called the "horizontal polarization," and the second polarization state $|V\rangle$ represents an electromagnetic wave polarized in a second direction orthogonal to the first direction and called "vertical polarization." The polarization basis states satisfy the following conditions:

$\langle H|H\rangle = \langle V|V\rangle = 1$, and $\langle H|V\rangle = 1$

Figure 6A:
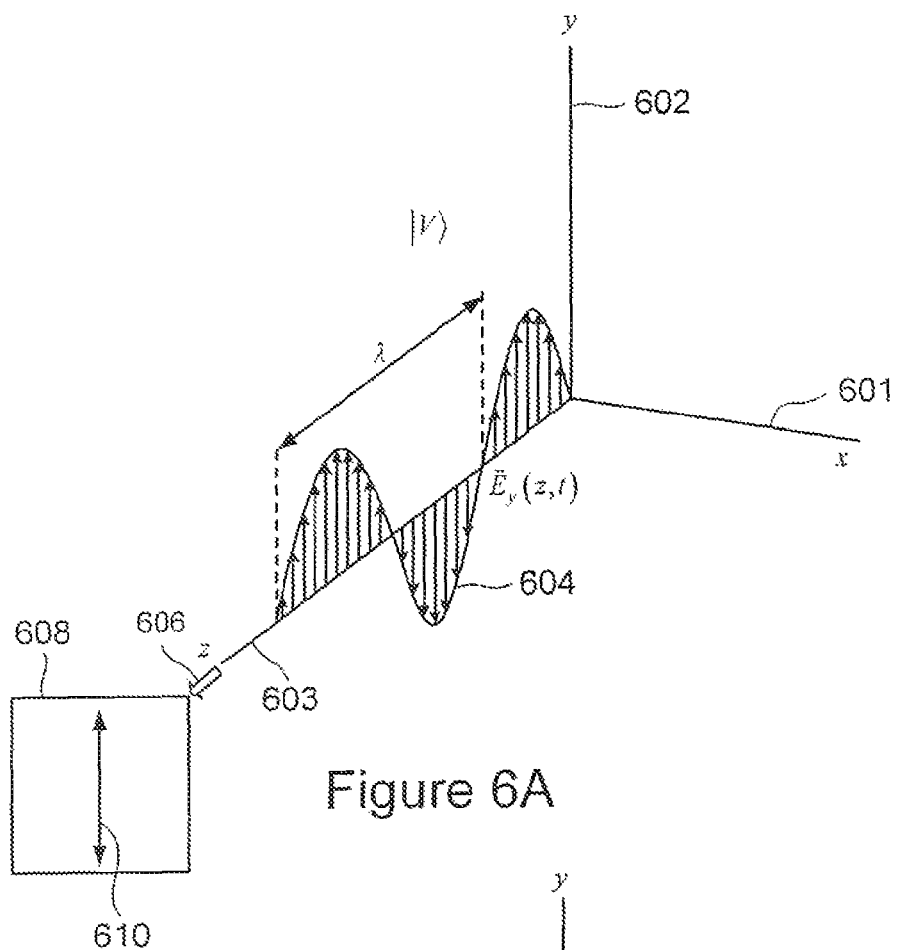
FIGS. 6A-6B show plots of vertical and horizontal polarization basis states.
Figure 6B:
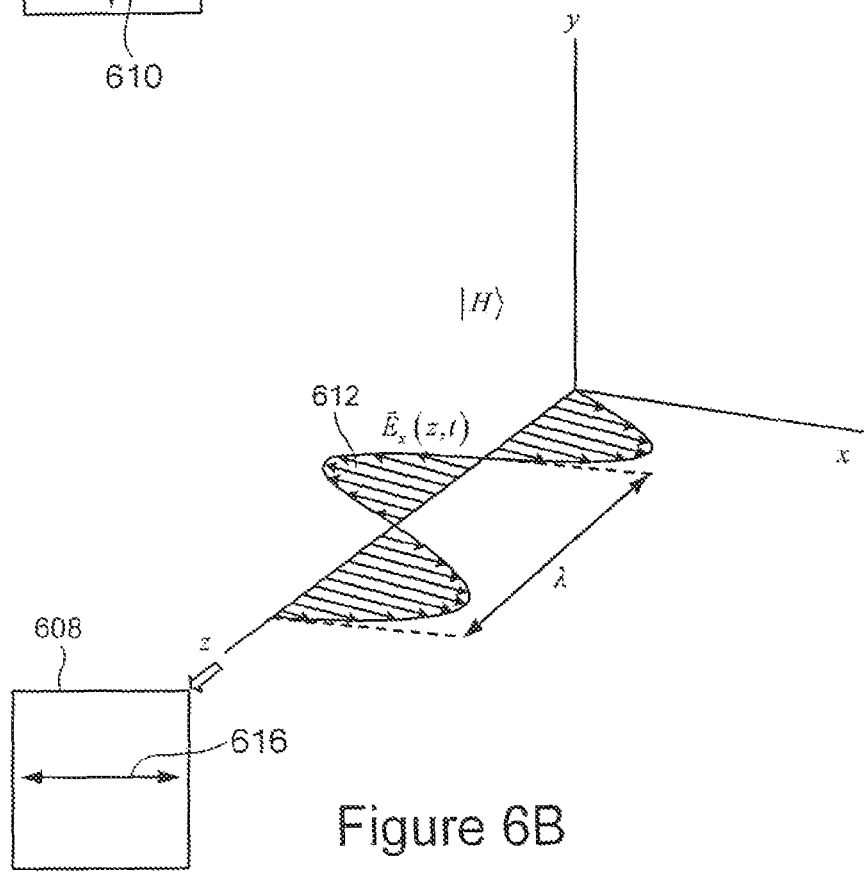

FIGS. 6A-6B show plots of the polarization basis states $|H\rangle$ and $|V\rangle$. In FIGS. 6A-6B, mutually perpendicular axes, such as mutually perpendicular axes 601-603 in FIG. 6A, represent the x, y, and z Cartesian coordinate axes, respectively. FIG. 6A shows a vertical polarization state $|V\rangle$ of an electric field $\vec{E}_y(z,t)$ 604 that lies in the yz-plane. Directional arrow 606 represents the direction the electric field $\vec{E}_y(z,t)$ 604 propagates toward a plane of observation 608. From the plane of observation 608, one can observe the electric field $\vec{E}_y(z,t)$ 604 progress through one complete oscillatory cycle as the wave propagates along the z-axis through one wavelength $\lambda$. The oscillatory cycle is represented by a double-headed directional arrow 610. FIG. 6B shows a horizontal polarization state $|H\rangle$ of an electric field $\vec{E}_x(z,t)$ 612 that lies in the xz-plane. The associated horizontal oscillatory cycle is represented by a double-headed directional arrow 616 in the plane of observation 608.

The polarization basis $\{|H\rangle, |V\rangle\}$ can also be used to construct an infinite number of polarization states represented by $|\chi\rangle$. These polarization states can be represented mathematically as a coherent linear superposition of states:

$$|\chi\rangle = \cos\left(\frac{\theta}{2}\right)|H\rangle + e^{i\phi}\sin\left(\frac{\theta}{2}\right)|V\rangle$$

where
$0 \leq \theta < \pi$, and
$0 \leq \phi < 2\pi$.

An infinite number of polarization states of an electromagnetic wave can be geometrically represented by a three-dimensional Bloch sphere, which in this case is also called the "Poincare sphere."

Figure 7:
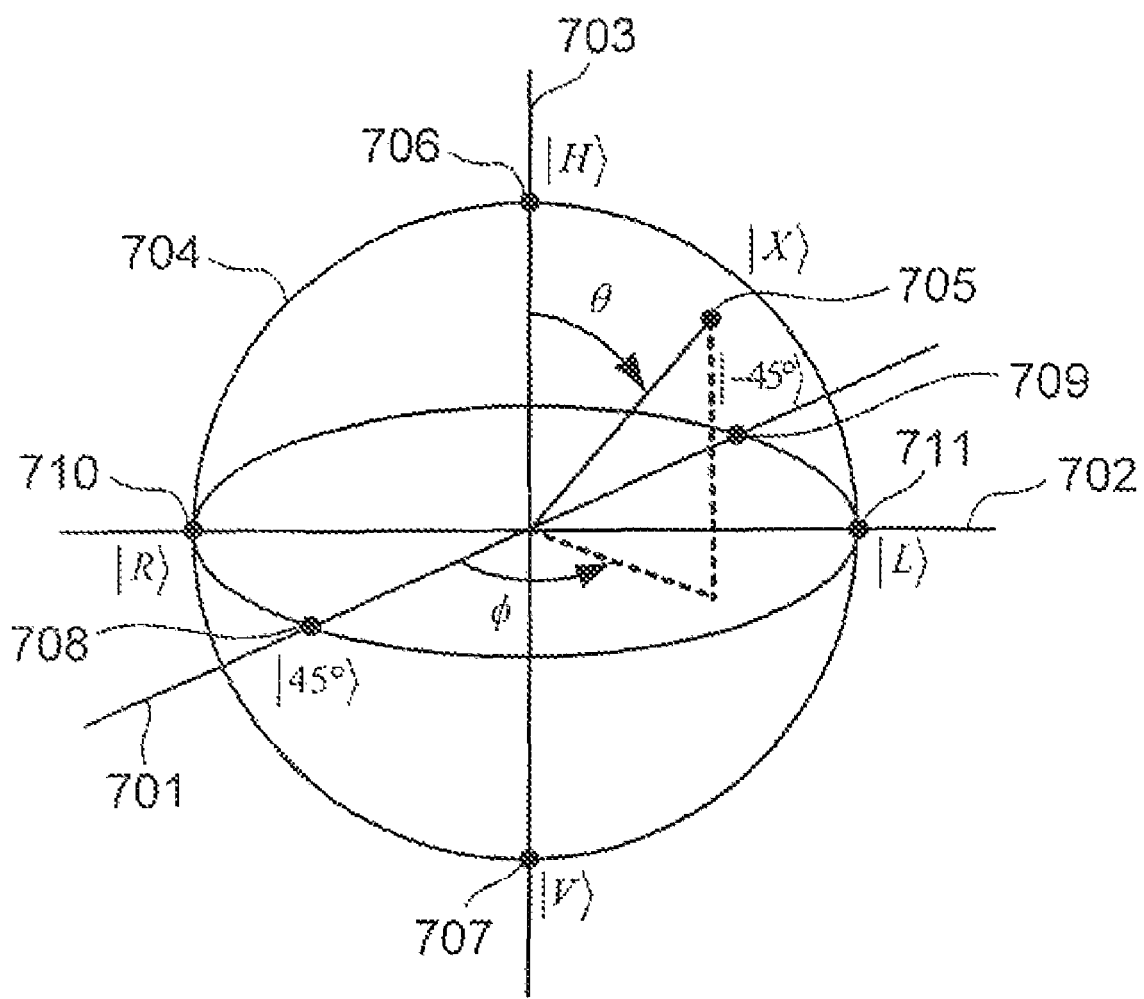
FIG. 7 illustrates a Poincare sphere representation of polarization states.

FIG. 7 illustrates a Poincare sphere representation of polarization states. As shown in FIG. 7, lines 701-703 are orthogonal coordinate axes, respectively, and a Poincare sphere 704 is centered at the origin. There are an infinite number of points on the Poincare sphere 704, each point representing a unique pure polarization state $|\chi\rangle$ of an electromagnetic wave. For example, a point 705 represents a polarization state $|\chi\rangle$ that simultaneously comprises, in part, the state $|H\rangle$ and, in part, the state $|V\rangle$. The six points 706-711 identify intersections between the Poincare sphere 704 and the coordinate axes 701-703. The points 706 and 707 identify the polarization basis states $|H\rangle$ and $|V\rangle$, respectively, and the points 708-711 represent orthogonal polarization states:

$$|45^\circ\rangle = \frac{1}{\sqrt{2}}(|H\rangle + |V\rangle),$$

-continued $$|-45°\rangle = \frac{1}{\sqrt{2}}(|H\rangle - |V\rangle),$$

$$|R\rangle = \frac{1}{\sqrt{2}}(|H\rangle + i|V\rangle), \text{ and}$$

$$|L\rangle = \frac{1}{\sqrt{2}}(|H\rangle - i|V\rangle),$$

respectively.

Figure 8A:
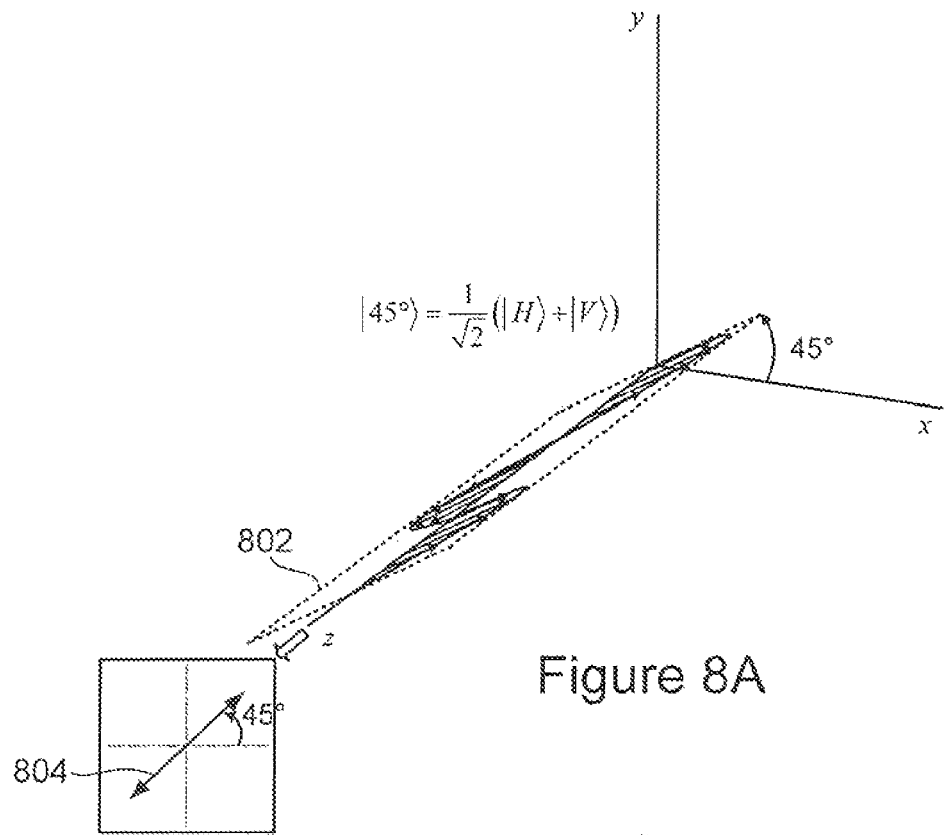
FIGS. 8A-8D show plots of four polarization states.
Figure 8B:
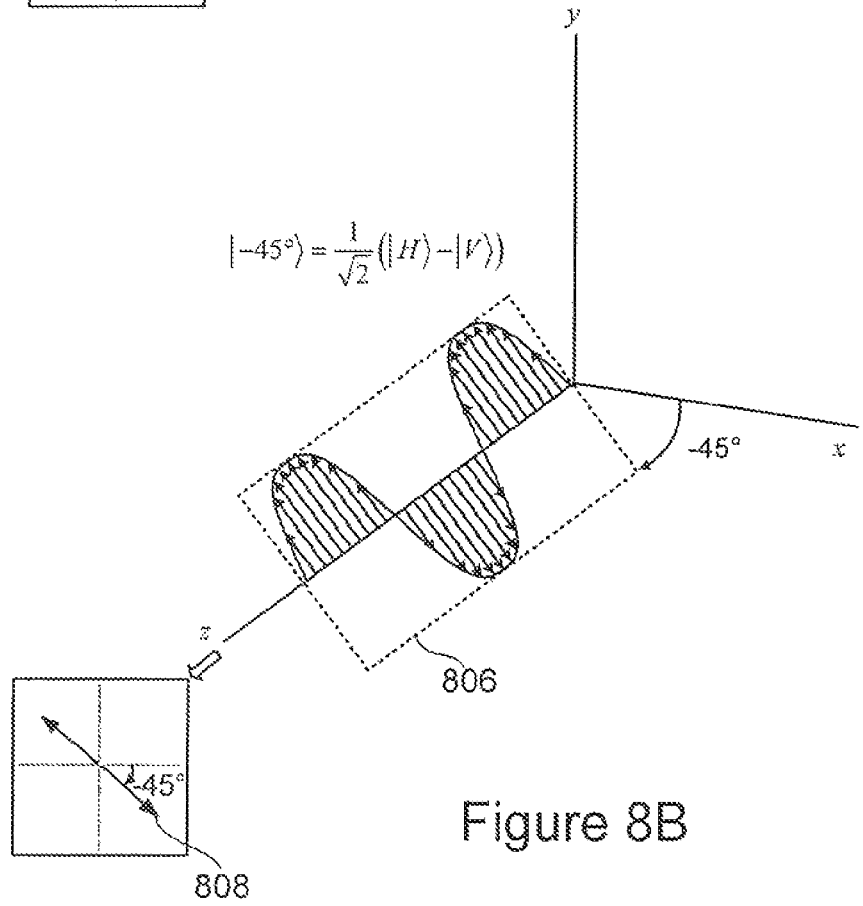
Figure 8C:
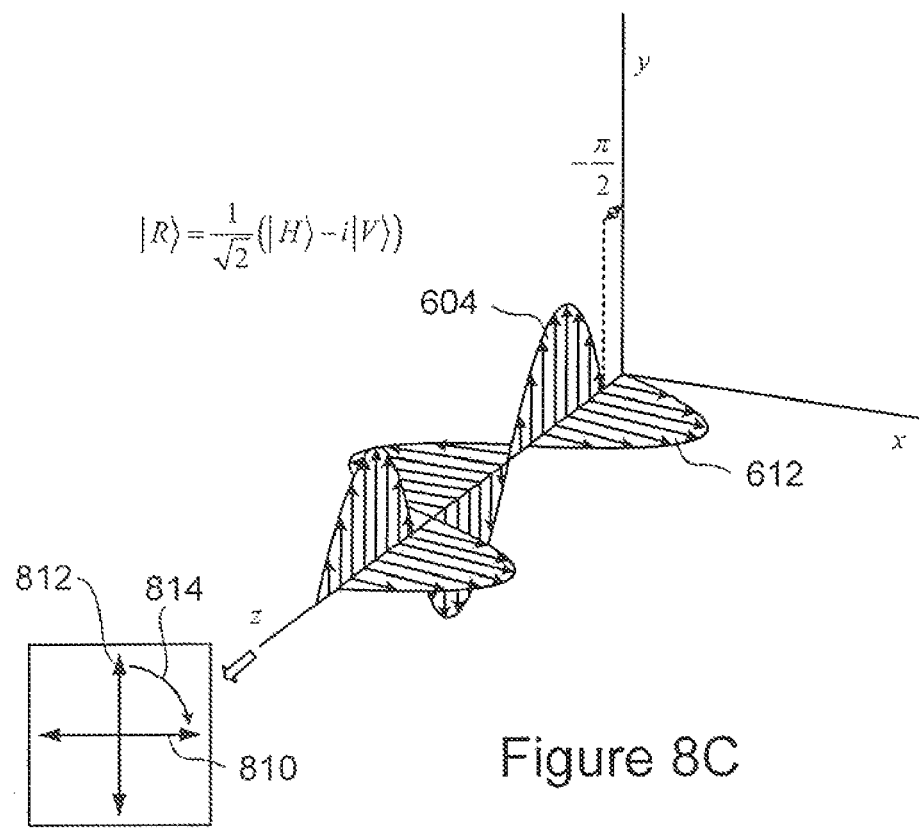
Figure 8D:
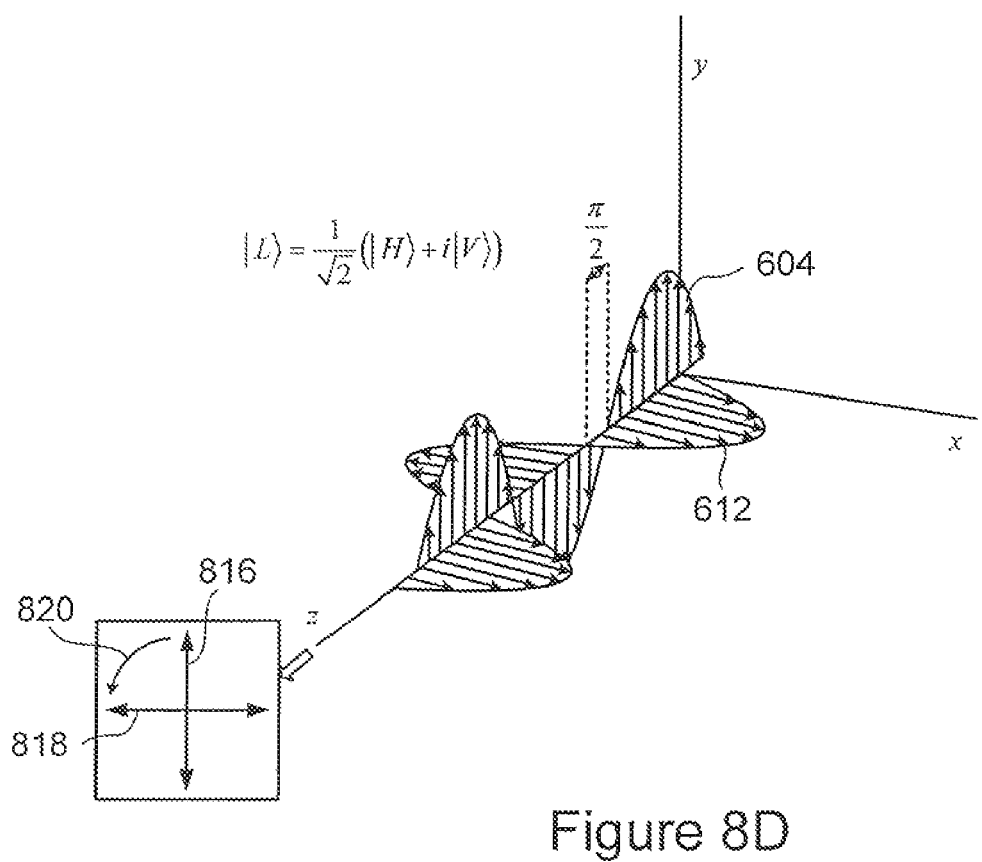

FIGS. 8A-8D show plots of the four polarization states $|45°\rangle$, $|-45°\rangle$, $|R\rangle$, and $|L\rangle$, respectively. FIG. 8A shows the 45° polarization state $|45°\rangle$ that lies within a plane-of-vibration 802 tilted at a 45° angle to the horizontal xz-plane. The oscillatory cycle of the polarization state $|45°\rangle$ is represented by a double-headed directional arrow 804. FIG. 8B shows the −45° polarization state $|45°\rangle$ that lies within a plane-of-vibration 806 tilted at a −45° angle to the horizontal xz-plane. The oscillatory cycle of the polarization state $|45°\rangle$ is represented by a double-headed directional arrow 808. FIG. 8C shows a right-handed circularly polarization state $|R\rangle$ comprising the vertical and horizontal polarized fields 604 and 612, shown in FIGS. 6A and 6B, with a relative phase difference δ of −π/2. The oscillatory cycle of the right-handed polarization state is represented by orthogonal double-headed directional arrows 810 and 812 that appear to rotate in a clockwise direction 814. FIG. 8D shows a left-handed circularly polarization state also comprising the vertical and horizontal polarized fields 604 and 612 with a relative phase difference δ of π/2. The oscillatory cycle of the left-hand polarization state is represented by orthogonal double-headed directional arrows 816 and 818 that appear to rotate in a counterclockwise direction 820.

Any polarization state can be represented by a linear combination of four quantities, called "Stokes parameters." Stokes parameters are a convenient way to represent the polarization states of quasi-monochromatic electromagnetic radiation because electromagnetic radiation measurements typically can only determine intensities or the number of photons and not the polarization states. The Stokes parameters all have the same dimension and, for a monochromatic wave, are given by the four quantities:

$$S_0 = \langle a_1^2 \rangle + \langle a_2^2 \rangle,$$

$$S_1 = \langle a_1^2 \rangle - \langle a_2^2 \rangle,$$

$$S_2 = 2\langle a_1 a_2 \cos \delta \rangle, \text{ and}$$

$$S_3 = 2\langle a_1 a_2 \sin \delta \rangle$$

where the symbol "$\langle \cdot \rangle$" represents the average value;

$a_1$ and $a_2$ are instantaneous amplitudes of two different orthogonal components $E_x$ and $E_y$ of the electric field vector; and δ is the phase difference between the components $E_x$ and $E_y$.

Only three of the Stokes parameters for a monochromatic wave are independent since the parameters are also related by the identity:

$$S_0^2 = S_1^2 + S_2^2 + S_3^2$$

Note that for a partially coherent quasi-monochromatic wave, the Stokes parameters are related by the inequality:

$$S_0^2 \geq S_1^2 + S_2^2 + S_3^2$$

The Stokes parameters are related to one another by the following Stokes relations:

$$S_1 = S_0 \cos 2\chi \cos 2\psi,$$

$$S_2 = S_0 \cos 2\chi \sin 2\psi, \text{ and}$$

$$S_3 = S_0 \sin 2\chi$$

where $$0 \leq \psi \leq \pi, \text{ and}$$

$$-\frac{\pi}{4} \leq \chi \leq \frac{\pi}{4}$$

Figure 9:
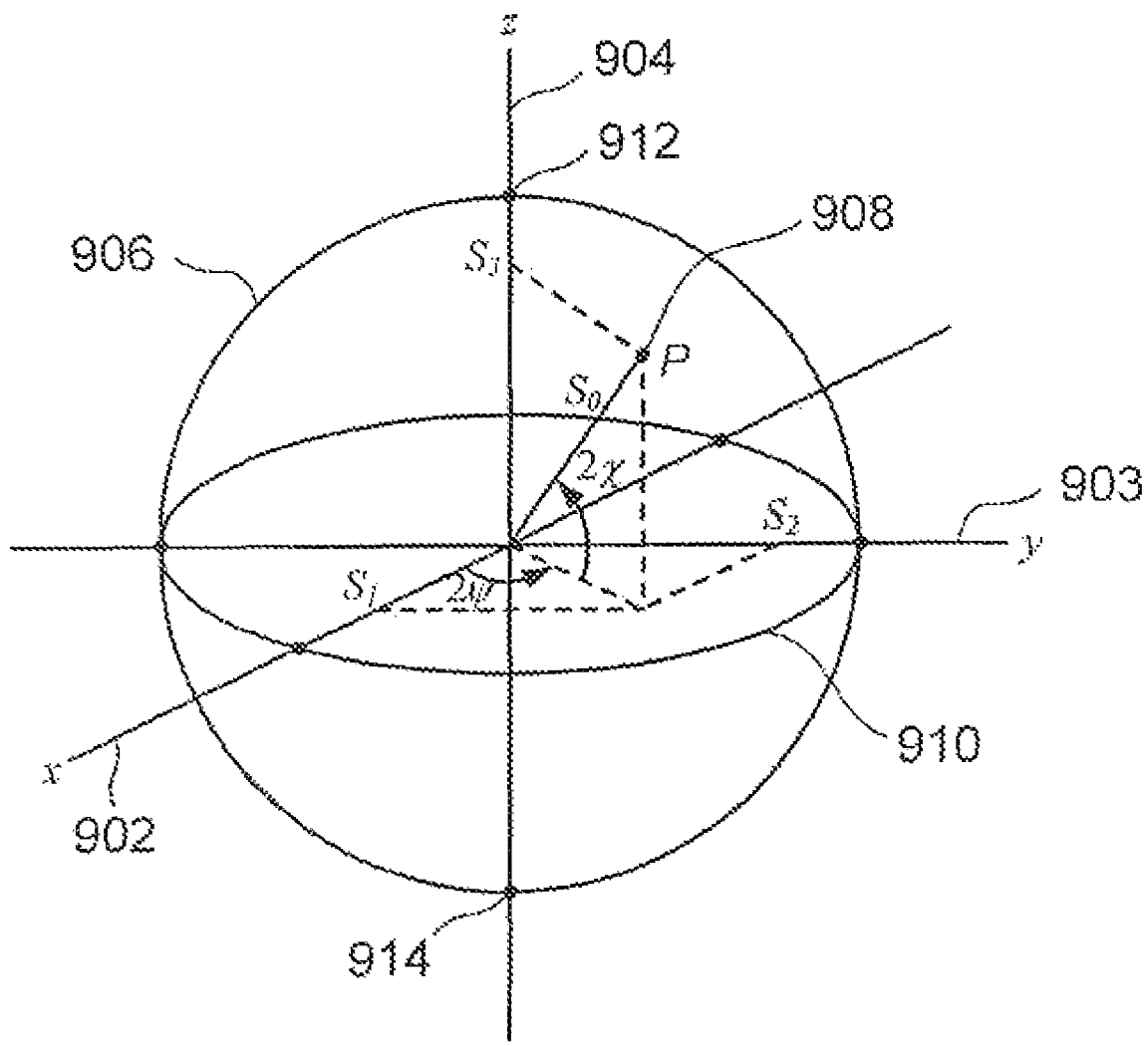
FIG. 9 illustrates a geometric representation of Stokes parameters.

FIG. 9 illustrates a geometric representation of the Stokes parameters $S_1$, $S_2$, and $S_3$. As shown in FIG. 9, lines 902-904 are orthogonal x, y, and z Cartesian coordinate axes, respectively. The sphere 906 of radius $S_0$ is a geometric representation of all the different polarization states. The Stokes parameters $S_1$, $S_2$, and $S_3$ are regarded as the Cartesian coordinates of a point P 908 on the sphere 906 and 2χ and 2ψ are the spherical angular coordinates. For every possible polarization state of a given intensity $S_0$, there is a corresponding point on the sphere 906 and vice versa. Right-handed polarization is represented by points on the sphere 906 that lie above the equatorial xy-plane 910, and left-handed polarization is represented by points that on the sphere 906 that lie below the equatorial xy-plane 910. For linearly polarized electromagnetic radiation, the phase difference δ is zero or an integral multiple of π and the parameter $S_3$ is zero. In other words, linearly polarized electromagnetic waves are represented by points that lie at the intersection of the sphere 906 and the xy-plane 910. For circularly polarized electromagnetic radiation, $\langle a_1 \rangle$ equals $\langle a_2 \rangle$ and the phase difference δ is π/2 or −π/2. Therefore, right-handed circularly polarized electromagnetic radiation is represented by a point 912, and left-handed circularly polarized electromagnetic radiation is represented by a point 914. Note that for partially coherent quasi-monochromatic waves, the states are represented by points that lie inside the sphere 906, as indicated by the inequality above.

Typically, the Stokes parameters are normalized by dividing each parameter by the parameter $S_0$, which is equivalent to using an incident beam of unit intensity. The Stokes parameters $(S_0, S_1, S_2, S_3)$ for randomly polarized electromagnetic radiation in the normalized representation are (1, 0, 0, 0), which corresponds to the center of the sphere 906. The normalized Stokes parameters are listed in Table I:

TABLE I

|       | $\|H\rangle$ | $\|V\rangle$ | $\|45°\rangle$ | $\|-45°\rangle$ | $\|R\rangle$ | $\|L\rangle$ |
|-------|----|----|------|-------|----|----|
| $S_0$ | 1  | 1  | 1    | 1     | 1  | 1  |
| $S_1$ | 1  | −1 | 0    | 0     | 0  | 0  |
| $S_2$ | 0  | 0  | 1    | −1    | 0  | 0  |
| $S_3$ | 0  | 0  | 0    | 0     | 1  | −1 |

The Stokes parameters of any quasi-monochromatic wave of electromagnetic radiation may be determine by intensity or photon number measurements and are given by the relations:

$$S_0 = I(0°, 0) + I(90°, 0),$$

$$S_1 = I(0°, 0) - I(90°, 0),$$

-continued
$$S_2 = I(45°, 0) - I(-45°, 0), \text{ and}$$

$$S_3 = I\left(45°, \frac{\pi}{2}\right) - I\left(-45°, \frac{\pi}{2}\right),$$

where $I(\theta, \in)$ represents intensity of electromagnetic radiation with the electric field vibrations making an angle of $\theta$ with the x-axis when the y-component is subjected to a retardation $\in$ with respect to the x-component. For example, the intensities $I(0°, 0)$ and $I(90°, 0)$ represent the intensities of horizontally and vertically polarized electromagnetic radiation, $I(45°, 0)$ and $I(-45°, 0)$ can represent the intensity of $45°$ and $-45°$ polarized electromagnetic radiation, and $$I\left(45°, \frac{\pi}{2}\right) \text{ and } I\left(-45°, \frac{\pi}{2}\right)$$

represent right-handed and left-handed circularly polarized electromagnetic radiation.

Note that the parameter $S_0$ represents the total intensity. The parameter $S_1$ equals the excess in intensity of electromagnetic radiation transmitted by a polarizer which accepts linear polarization with an angle of $\theta$ equal to $0°$ over electromagnetic radiation transmitted with by a polarizer which accepts linear polarization with an angle of $\theta$ equal to $90°$. The parameter $S_2$ has a similar interpretation. The parameter $S_3$ equals the excess in intensity of electromagnetic radiation transmitted by a polarizer which accepts right-handed circularly polarized electromagnetic radiation, over left-handed circularly polarized electromagnetic radiation.

EMBODIMENTS OF THE PRESENT INVENTION

Various system embodiments of the present invention are directed to self-authenticating QRBGs that can be integrated into optoelectronic devices. Method embodiments of the present invention include tomographic analysis, which is used to evaluate and authenticate the randomness of a sequence of random bits generated by the system embodiments of the present invention.

I. Quantum Random Bit Generators

Figure 10:
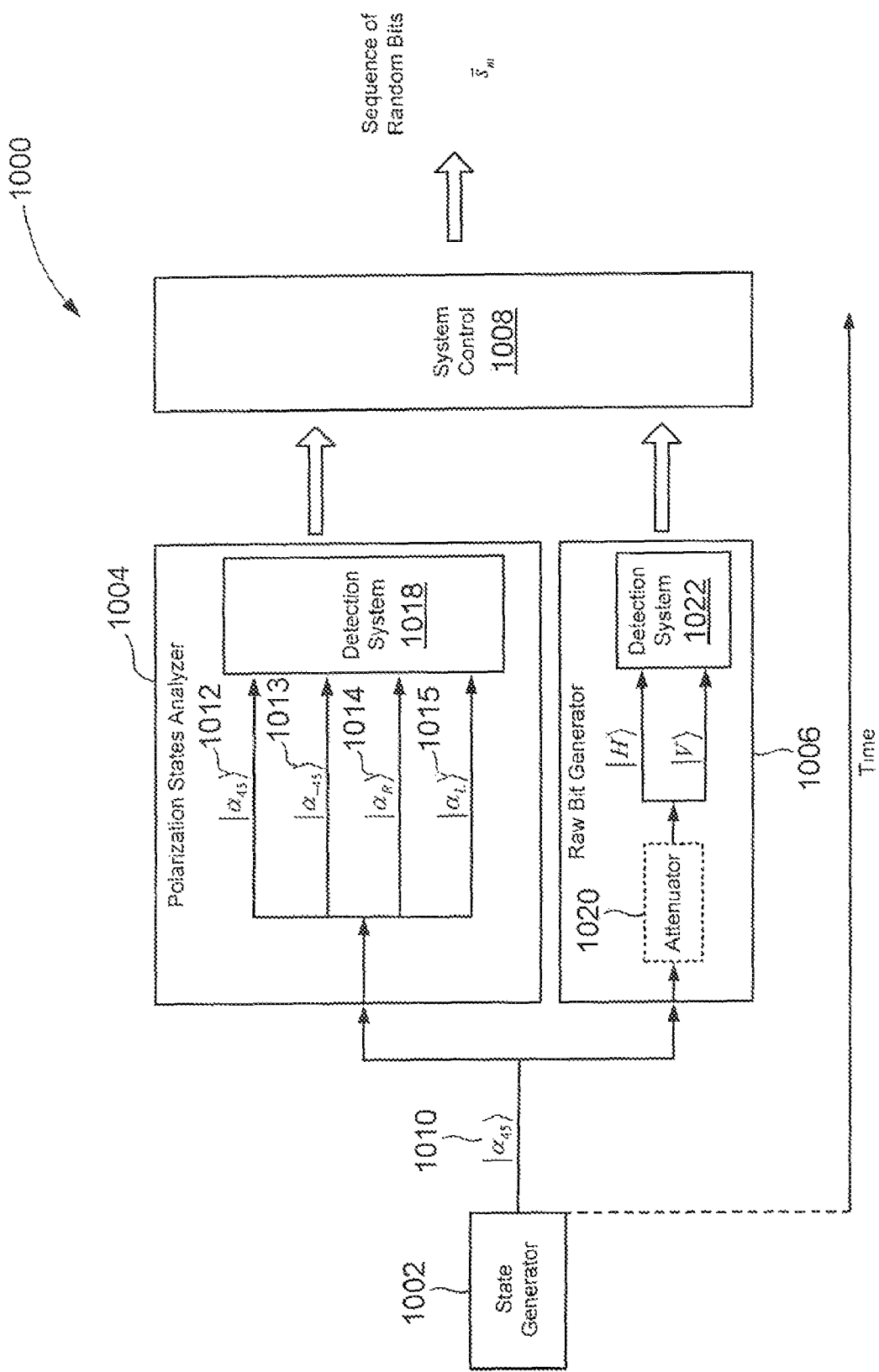
FIG. 10 illustrates a general schematic representation of a quantum random number generator that represents an embodiment of the present invention.

FIG. 10 illustrates a general schematic representation of a QRBG 1000 that represents an embodiment of the present invention. The QRBG 1000 comprises a state generator 1002, a polarization states analyzer ("PSA") 1004, a raw bit generator ("RBG") 1006, and a system control 1008. The state generator 1002 outputs a 45° polarized pulse 1010 of electromagnetic radiation in a coherent state:

$$|\alpha_{45}\rangle = \frac{1}{\sqrt{2}}(|\alpha_H\rangle + |\alpha_V\rangle)$$

where
$|\alpha_H\rangle$ represents a horizontally polarized coherent state, and
$|\alpha_V\rangle$ represents a vertically polarized coherent state.

The term "horizontal" refers to electromagnetic waves with the electric field component polarized in the plane of the QRBG 1000, and the term "vertical" refers to electromagnetic waves with the electric field component polarized orthogonal to the plane of the QRBG 1000. The polarized pulse of electromagnetic radiation $|\alpha_{45}\rangle$ 1010 is split so that a first portion of the pulse $|\alpha_{45}\rangle$ 1010 is transmitted to the PSA 1004 and a second portion of the pulse $|\alpha_{45}\rangle$ 1010 is transmitted to the RBG 1006. Various system embodiments for the PSA 1004 and the RBG 1006 are described below with reference to FIGS. 11-14. For each pulse $|\alpha_{45}\rangle$ 1010 generated by the state generator 1002, the PSA 1004 projects the initial state onto four different polarized coherent states of electromagnetic radiation. The four differently polarized coherent states are: (1) a 45° polarized pulse $|\alpha_{45}\rangle$ 1012, (2) a $-45°$ polarized pulse $|\alpha_{-45}\rangle$ 1013, (3) a right-handed circularly polarized pulse $|\alpha_R\rangle$ 1014, and (4) a left-handed circularly polarized pulse $|\alpha_L\rangle$ 1015. The PSA 1004 includes a detection system 1018 that detects the states 1012-1015 and transmits the detection results to the system control 1008. The RBG 1006 may include an optional attenuator 1020 that reduces the number of photons in the pulse $|\alpha_{45}\rangle$ 1010 as follows:

$$|\alpha_{45}\rangle \xrightarrow{ATT} \begin{cases} |0\rangle & \text{when no pulse is present} \\ \frac{1}{\sqrt{2}}(|H\rangle + |V\rangle) & \text{when a pulse is present} \end{cases}$$

where
$|H\rangle$ represents a horizontally polarized pulse comprising a single photon; and
$|V\rangle$ represents a vertically polarized pulse comprising a single photon.

The RBG 1006 includes a detection system 1022 that detects the presence of a single photon and transmits the detection result to the system control 1008.

The photon polarization states $|H\rangle$ and $|V\rangle$ are used to encode bits. For example, detection of the state $|H\rangle$ can be used to represent the binary number "1" and detection of the state $|V\rangle$ can be used to represent the binary number "0." For N operation cycles of the QRBG 1000, the system control 1008 receives the detection results supplied by the PSA 1004 and the RBG 1006 and outputs a sequence of random bits represented by a vector $\vec{s}_m$, where m represents the number of random bits and m<N. Method embodiments described below with reference to FIGS. 15-22 are directed to constructing the sequence of random bits $\vec{s}_m$.

FIGS. 11-16 illustrate various QRBG system embodiments of the present invention that are in accordance with the general schematic QRBG 1000 described above. In the interest of brevity, components that are common to the various QRBGs, shown in FIGS. 11-16, are provided with the same reference numerals and an explanation of their structure and function is not repeated.

Figure 11:
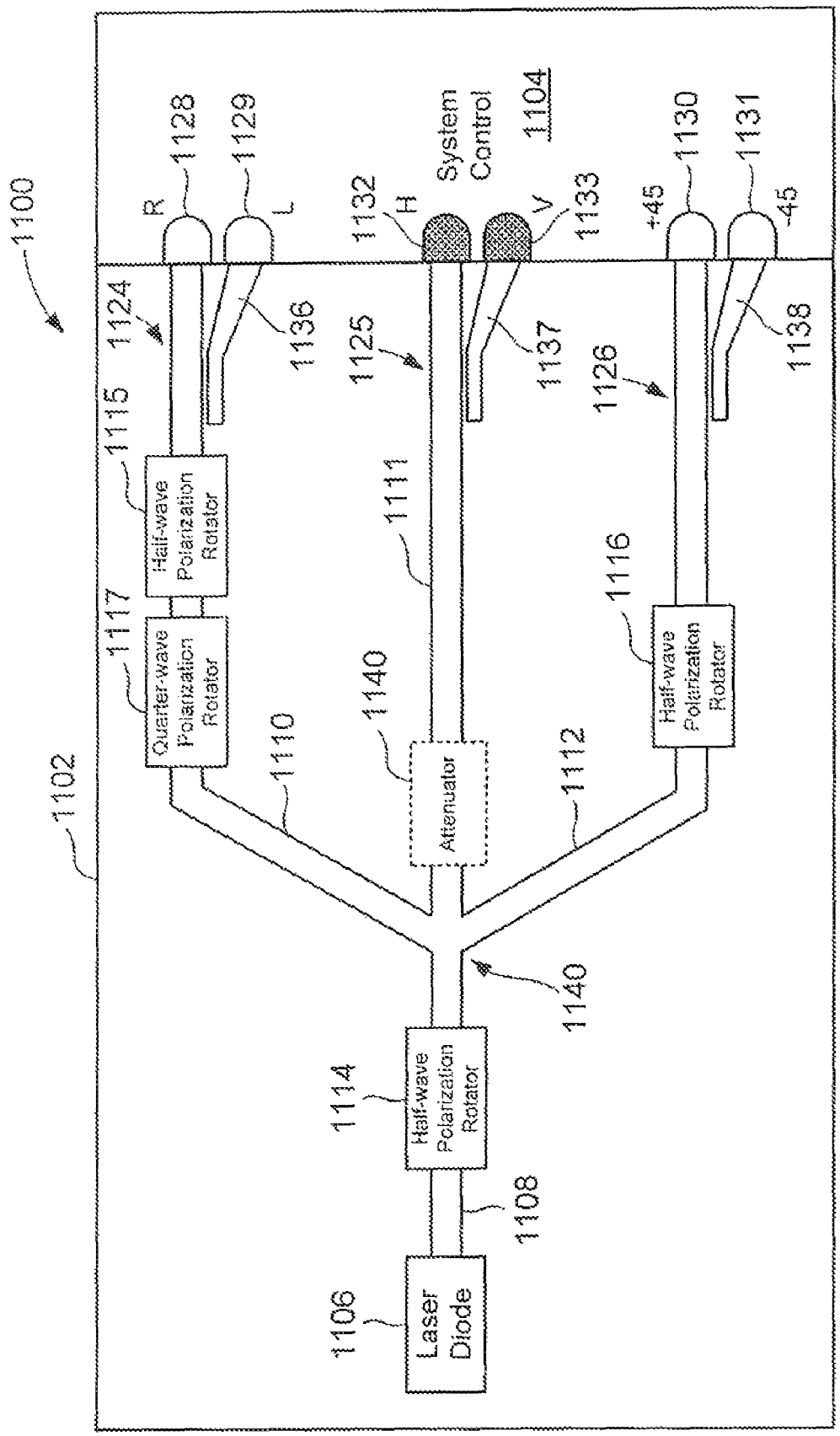
FIG. 11 illustrates a schematic representation of a first quantum random bit generator that represents an embodiment of the present invention.

FIG. 11 illustrates a schematic representation of a first QRBG 1100 that represents an embodiment of the present invention. The QRBG 1100 comprises an electromagnetic radiation transmission layer 1102 and a system control 1104. The transmission layer 1102 includes a laser diode 1106 and a ridge waveguide 1108 that splits into three waveguides 1110-1112. The transmission layer 1102 can be fabricated from a slab of silicon oxynitride ("SiON") or a suitable optical polymer, such as SU-8. The waveguides 1108 and 1110-1112 can be formed in the slab using various well-known reactive ion etching and lithographic methods. The QRBG 1100 includes three half-wave polarization rotators 1114-

1116, and a quarter-wave polarization rotator 1117. The kinds of polarization rotators that can be used to introduce polarization into the waveguides 1110 and 1112 are described below with reference to FIGS. 12 and 13. The QRBG 1100 includes three polarizing beamsplitters 1124-1126 located near the terminus of the waveguides 1110-1112, respectively. The polarizing beamsplitters 1124-1126 are each comprised of a tapered waveguide located in close proximity to the waveguides 1110-1112, respectively. For example, polarizing beamsplitter 1124 includes a shorter waveguide 1136. The tapered portions of the shorter waveguides are each configured so that vertically polarized pulse are evanescently extracted from the waveguides 1110-1112 while horizontally polarized pulses continue in the waveguides 1110-1112. The system control 1104 includes p-i-n photodetectors 1128-1131 and two avalanche photodiodes 1132 and 1133.

Figure 12A:
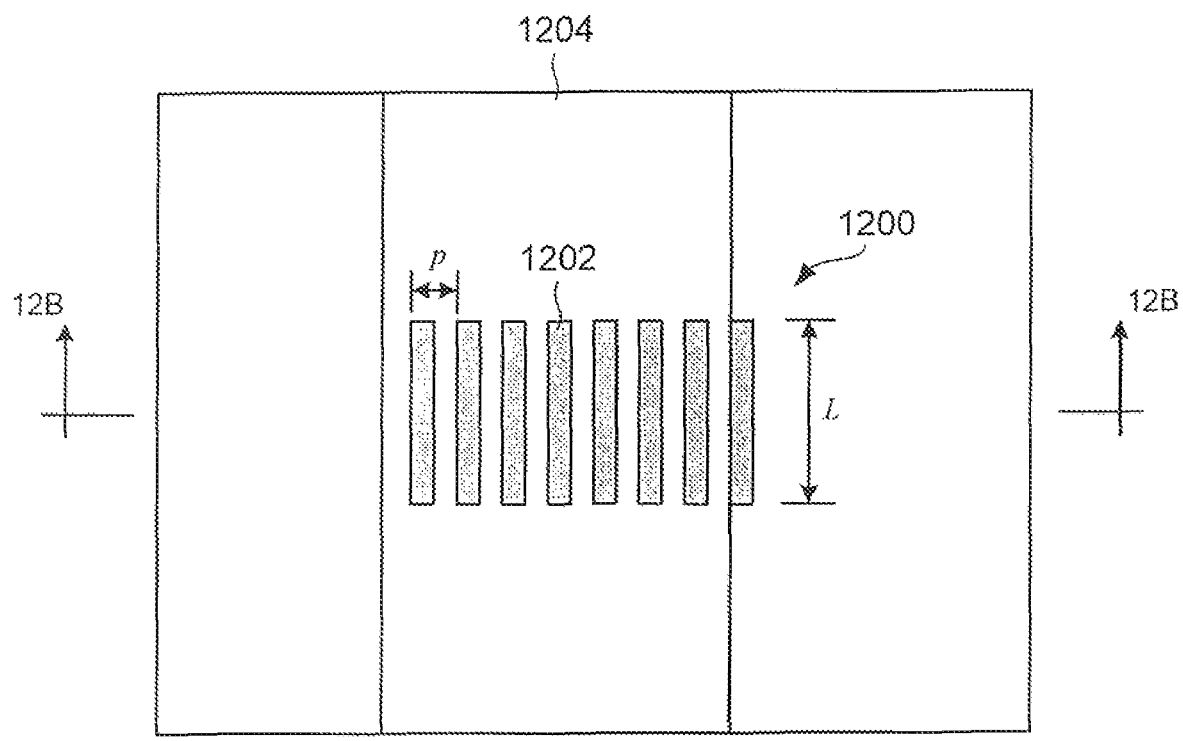
FIGS. 12A-12B illustrate a slotted polarization rotator that represents an embodiment of the present invention.
Figure 12B:
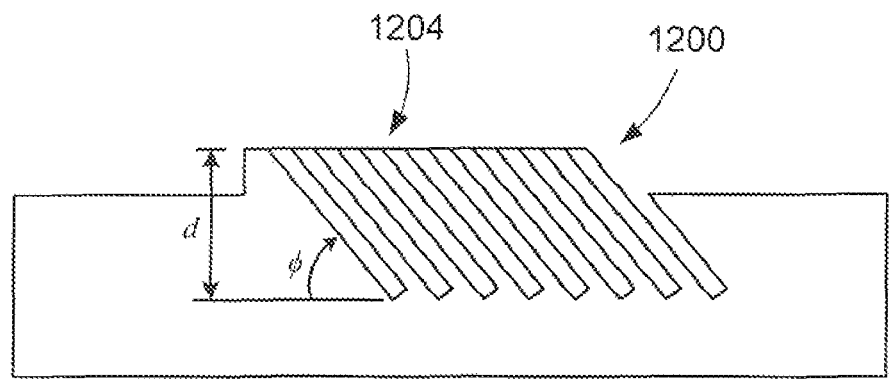

FIGS. 12A-12B illustrate a slotted polarization rotator 1200 that represents an embodiment of the present invention. FIG. 12A illustrates a top view of the slotted polarization rotator comprising 8 slots represented by shaded rectangles, such as shaded rectangle 1202. The slots have a substantially periodic spacing p and length L. FIG. 12B illustrates a cross-sectional view of the slotted polarization rotator 1200 shown in FIG. 12A that represents an embodiment of the present invention. The slots are etched into the ridge waveguide 1204 at an angle s and to a depth d. The slotted polarization rotator 1200 can be fabricated to operate similar to waveplate, which are well-known in larger scale optical applications. For example, in various embodiments of the present invention, the slotted polarization rotator 1200 can be fabricated with appropriately selected parameters L, p, φ, and d so that the slotted polarization rotator 1200 can be operated similar to a half-wave plate or a quarter-wave plate. For a more detailed description of slotted polarization rotators see "Compact polarization converter in InP-based material," by Maria V. Kotlyar et al., Optics Express, Vol. 13, No. 13, June 2005.

Figures 13A, 13B:
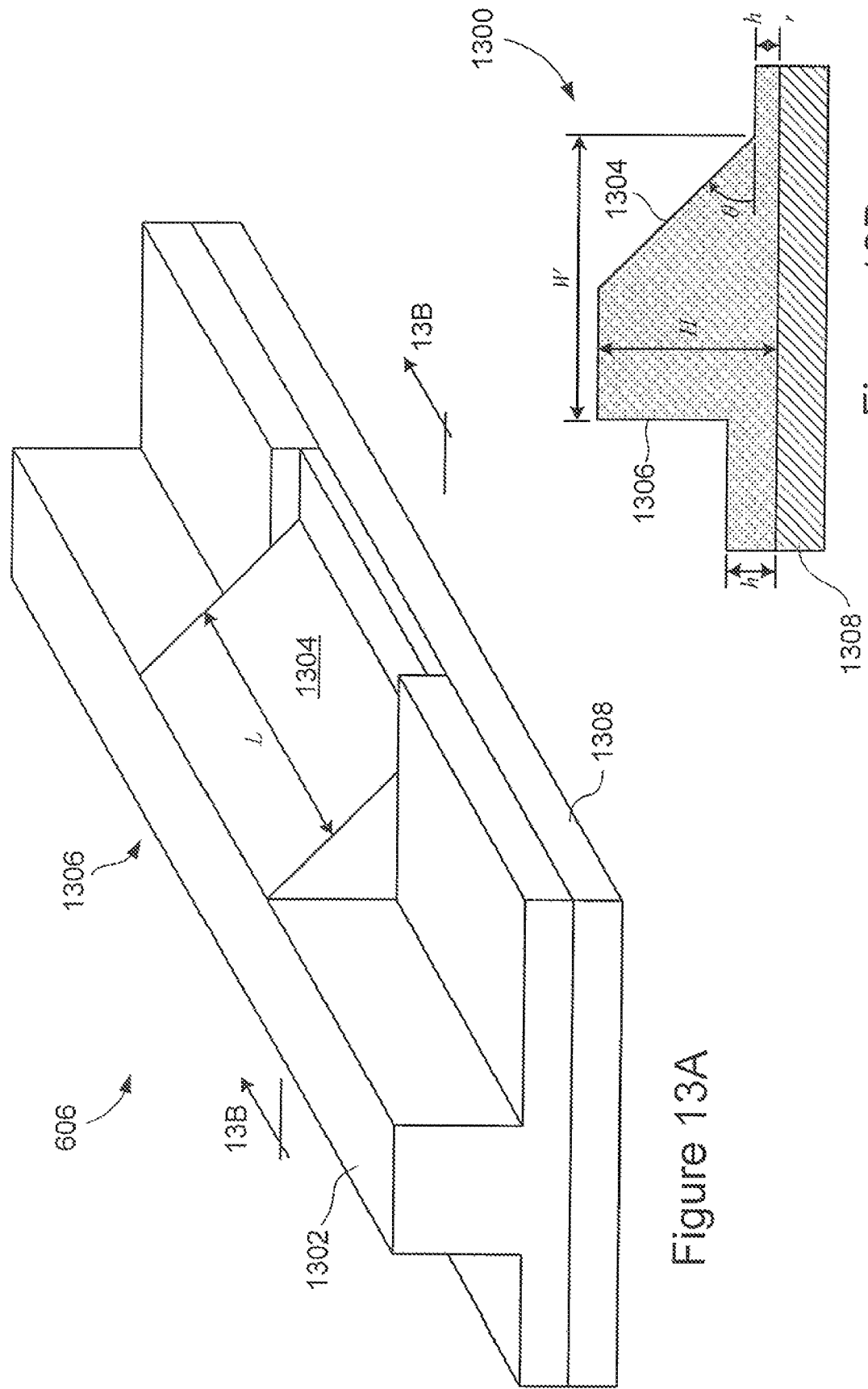
FIGS. 13A-13B illustrate a slanted-ridge polarization rotator that represents an embodiment of the present invention.

FIGS. 13A-13B illustrate a slanted-ridge polarization rotator 1300 that represents an embodiment of the present invention. FIG. 13A illustrates an isometric view of the slanted-ridge polarization rotator 1300 that represents an embodiment of the present invention. The slanted-ridge polarization rotator 1300 is of length L, is embedded in a ridge waveguide 1302, and comprises a sloped sidewall 1304 and an opposing vertical sidewall 1306. The slanted-ridge polarization rotator 1300 is supported by a suitable insulating layer 1308, such as $SiO_2$. FIG. 13B illustrates a cross-sectional view of the slanted-ridge polarization rotator 1300 that represents an embodiment of the present invention. The slanted-ridge polarization rotator 1300 can also be fabricated to operate similar to a waveplate. For example, in various embodiments of the present invention, the slanted-ridge polarization rotator 1300 can be fabricated with appropriately selected heights H, h, $h_r$, width W, and length L so that the slanted-ridge polarization rotator 1300 can be operated similar to a half-wave plate or a quarter-wave plate. For further description of slanted-ridge waveguides see "Passive silicon-on-insulator polarization-rotating waveguides," Optical Engineering 45(4), 044603, April 2006; "Bending characteristics of asymmetric SOI polarization rotators," IEEE Photonic Technology Letters, Vol. 17, No. 10, October 2005; "Slanted-rib waveguide InGaAsP-InP polarization converters," J. of Lightwave Technology, Vol. 22, No. 5, May 2004.

Returning to FIG. 11, the following is a general description of the operation of the QRBG 1100 for a single pulse generated by the laser diode 1106 that represents an embodiment of the present invention. The laser diode 1106 can be configured to emit coherent pulses of electromagnetic radiation in either a horizontal polarization state $|\alpha_H\rangle$ or a vertical polarization state $|\alpha_V\rangle$. The half-wave polarizing rotator 1114 receives the coherent pulse and outputs a 45° polarized coherent pulse $|\alpha_{45}\rangle$. The pulse $|\alpha_{45}\rangle$ is transmitted through a 3-way junction 1140 to give:

$$|\alpha_{45}\rangle \rightarrow c_A|\alpha_{45}\rangle_A + c_B|\alpha_{45}\rangle_B + c_C|\alpha_{45}\rangle_C$$

where $|c_A|^2 + |c_B|^2 + |c_C|^2 = 1$, $|\alpha_{45}\rangle_A$ represents a 45° polarized pulse transmitted in the waveguide 1110, $|\alpha_{45}\rangle_B$ represents a 45° polarized pulse transmitted in the waveguide 1111, and $|\alpha_{45}\rangle_C$ represents a 45° polarized pulse transmitted in the waveguide 1112.

The waveguide 1111 may optionally include an attenuator 1142 that reduces the intensity of the pulse $|\alpha_{45}\rangle_B$. The optional attenuator 1142 and polarizing beamsplitter 1125 corresponds to the RBG 1006, described above with reference to FIG. 10, and can be used to construct a sequence of bits by assigning the binary number "0" to a detection event at one of the avalanche photodiodes and assigning the binary number "1" to a detection event at the other avalanche photodiode. In various embodiments of the present invention, the attenuator 1142 can be fabricated by implanting a dopant in the waveguide 1111 that reduces the intensity of the pulse $|\alpha_{45}\rangle_B$ to a single photon of energy represented by:

$$|\alpha_{45}\rangle_B \xrightarrow{ATT} |45°\rangle$$

The polarizing beamsplitter 1125 splits the pulse $|45°\rangle$ so that there is a substantially equal probability of detecting a single photon pulse at the avalanche photodiode 1132 or detecting a single photon pulse at the avalanche photodiode 1133, which can be represented in the $\{|H\rangle, |V\rangle\}$ basis by:

$$|45°\rangle \xrightarrow{BS} \frac{1}{\sqrt{2}}(|H\rangle + |V\rangle)$$

where $|H\rangle$ represents a horizontally polarized single photon pulse transmitted in the waveguide 1111 and detected by the avalanche photodiode 11132, and $|V\rangle$ represents a vertically polarized single photon pulse transmitted in the waveguide 1136 and detected by the avalanche photodiode 1133.

The pulses $|\alpha_{45}\rangle_A$ and $|\alpha_{45}\rangle_C$ transmitted in the waveguides 1110 and 1112, respectively, are used to perform tomographic analysis as described below with reference to FIGS. 15-22. The waveguides 1110 and 1112 and corresponding polarization rotators 1115-1117 correspond to the PSA 1004, described above with reference to FIG. 10. The quarter-wave polarization rotator 1117 can be configured to delay the vertical polarization component of the incoming pulse by ¼ of a wavelength, and the half-wave polarization rotators 1115 and 1116 can be configured to rotate the polarization by 45°.

The following is a description of how the polarization rotators 1115 and 1117 operate on a pulses with an arbitrary polarization transmitted in the waveguide 1110. Before the pulse reaches the quarter-wave polarization rotator 1117, the pulse is represented in the $\{|\alpha_H\rangle, \alpha_V\rangle\}$ basis by:

$$|\beta\rangle_A = a|\alpha_H\rangle_A + b|\alpha_V\rangle_A$$

with $|a|^2+|b|^2=1$. The operation performed by the quarter-wave polarization rotator 1117 is characterized by:

$$|\beta\rangle_A \xrightarrow{QWPR} a|\alpha_H\rangle_A + ib|\alpha_V\rangle_A$$

Following the quarter-wave polarization rotator 1117 by appropriately fabricated half-wave polarization rotator 1115 gives:

$$a|\alpha_H\rangle_A + ib|\alpha_V\rangle_A \xrightarrow{HWPR} \frac{1}{\sqrt{2}}[(a+ib)|_H\rangle_A + (-a+ib)|\alpha_V\rangle_A]$$

The polarizing beamsplitter 1124 is configured so that the state $|\alpha_H\rangle_A$ is transmitted to the p-i-n photodetector 1128, and the state $|\alpha_V\rangle_A$ is transmitted to the p-i-n photodetector 1129.

Note that when the is initially prepared in a state with $a=b=1/\sqrt{2}$, the pulse just before reaching the quarter-wave polarization rotator 1117 is in the state $|\alpha_{45}\rangle_A$. The pulse emerging from the quarter-wave polarization rotator 1117 is right circularly polarized and represented by $|\alpha_R\rangle_A$, which, followed by the half-wave polarization rotator 1115, projects the pulse onto the state:

$$\frac{1}{2}[(1+i)|\alpha_H\rangle_A + (-1+i)|\alpha_V\rangle_A]$$

Hence the probability of detecting the horizontally polarized pulse $|\alpha_H\rangle_A$ at the p-i-n photodetector 1128 is ½, and the probability of detecting the vertically polarized pulse $|\alpha_V\rangle_A$ at the p-i-n photodetector 1129 is ½.

In general, a pulse with an arbitrary polarization transmitted in the waveguide 1112 just before the half-wave polarization rotator 1116 in the $\{|\alpha_H\rangle,\alpha_V\rangle\}$ basis is characterized by:

$$|\beta\rangle_C = a|\alpha_H\rangle_C + b|\alpha_V\rangle_C$$

with $|a|^2+|b|^2=1$. The operation performed by the half-wave polarization rotator 1116 is characterized by:

$$a|\alpha_H\rangle_C + b|\alpha_V\rangle_C \xrightarrow{HWPR} \frac{1}{\sqrt{2}}[(a+b)|_H\rangle_C + (-a+b)|\alpha_V\rangle_C]$$

Note that when the pulse is initially prepared in a state with $a=b=1/\sqrt{2}$, the pulse just before reaching the half-wave polarization rotator 1116 is in the state $|\alpha_{45}\rangle_C$. The state of the pulse emerging from the half-wave polarization rotator 1116 is give by:

$$|\alpha_H\rangle_C$$

In other words, the half-wave polarization rotator 1116 projects the state $|\alpha_{45}\rangle_C$ onto the state $|\alpha_H\rangle_C$. When initially $a=1/\sqrt{2}$ and $b=-1/\sqrt{2}$, the pulse just before reaching the half-wave polarization rotator 1116 is in the state $|\alpha_{-45}\rangle_C$. The state of the pulse emerging from the half-wave polarization rotator 1116 is give by:

$$|\alpha_V\rangle_C$$

In other words, the half-wave polarization rotator 1116 projects the state $|\alpha_{45}\rangle_C$ onto the state $|\alpha_V\rangle_C$.

Figure 14A:
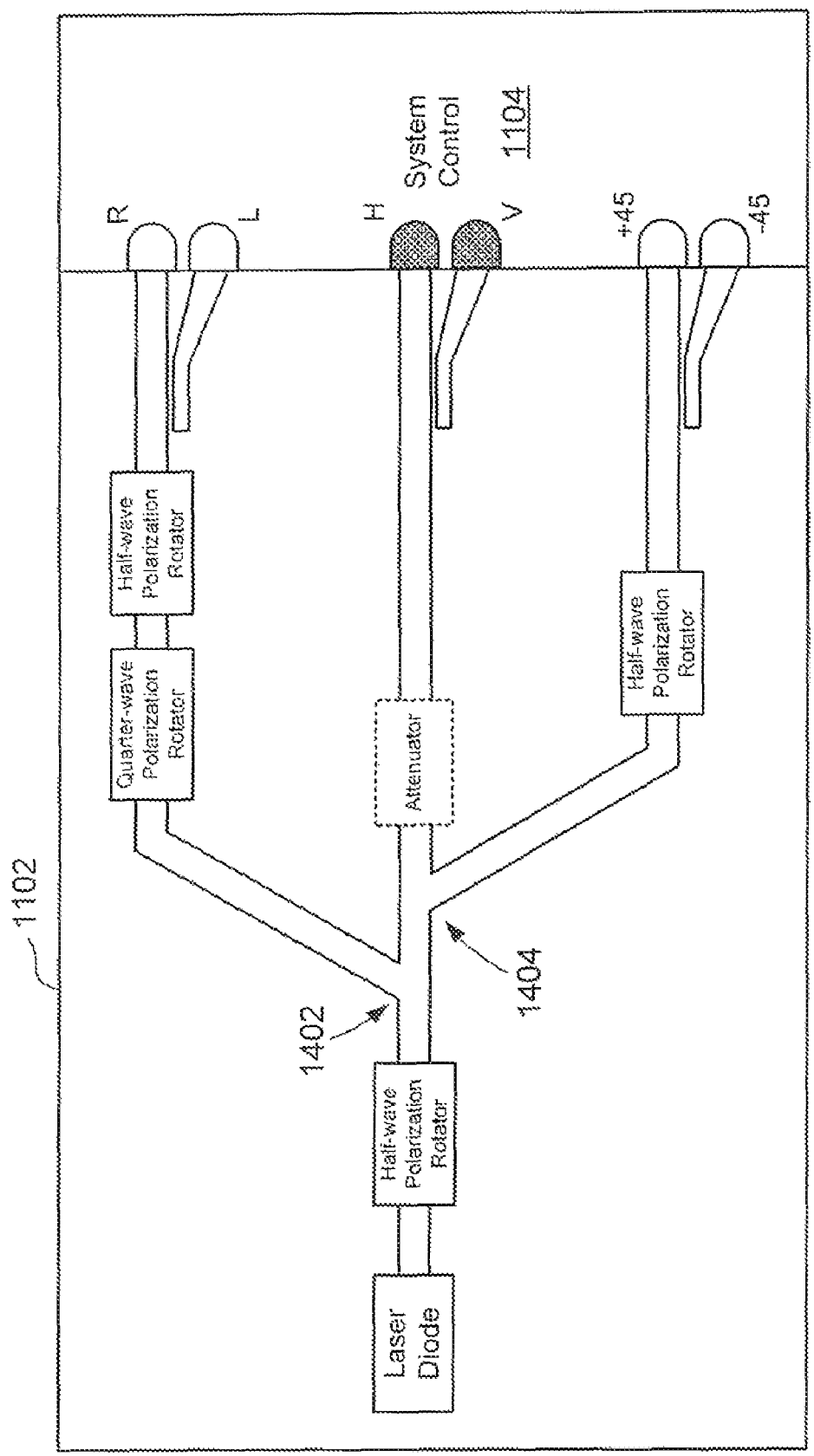
FIGS. 14A-14C illustrate schematic representations of three different random bit generators, each representing an embodiment of the present invention.
Figure 14B:
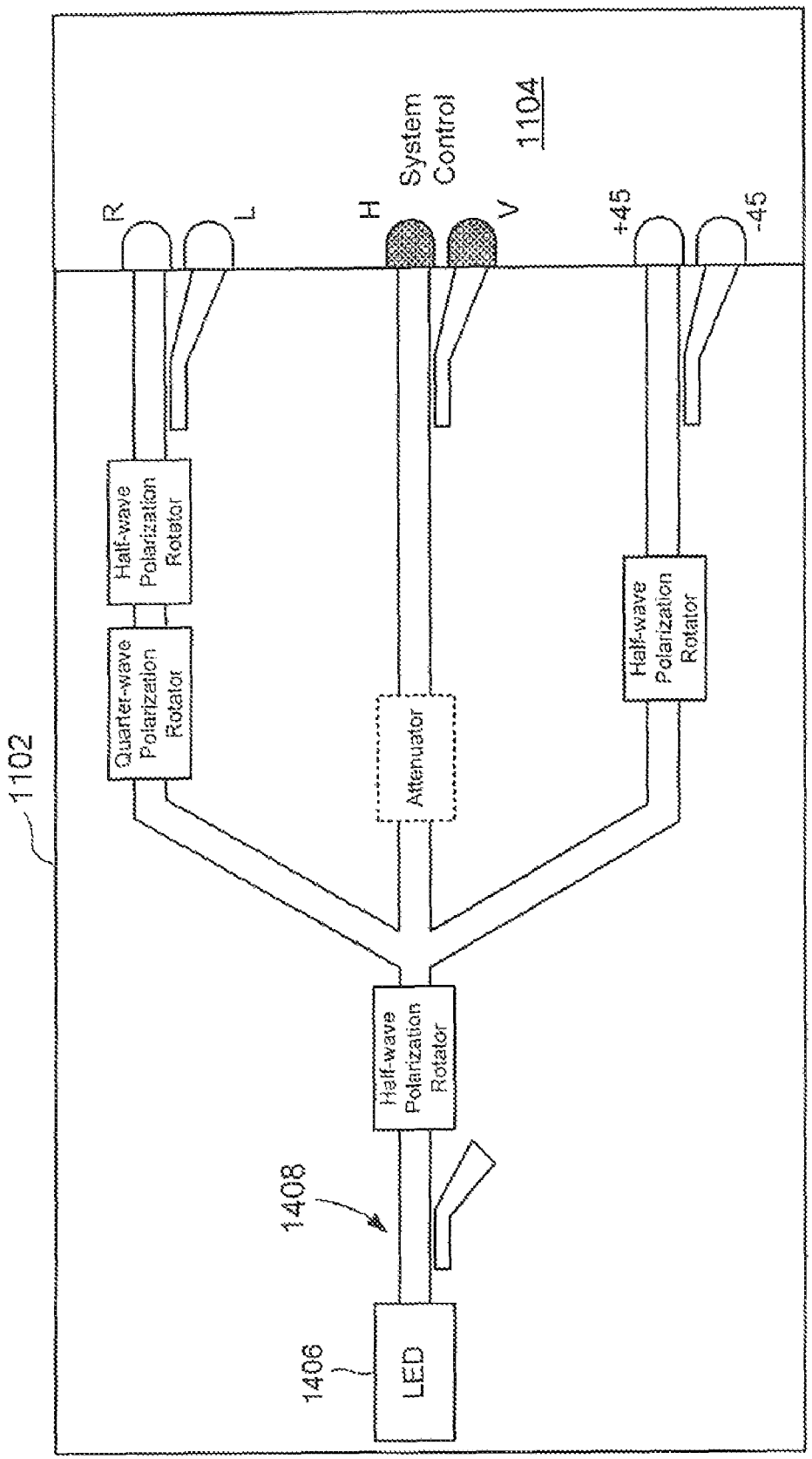
Figure 14C:
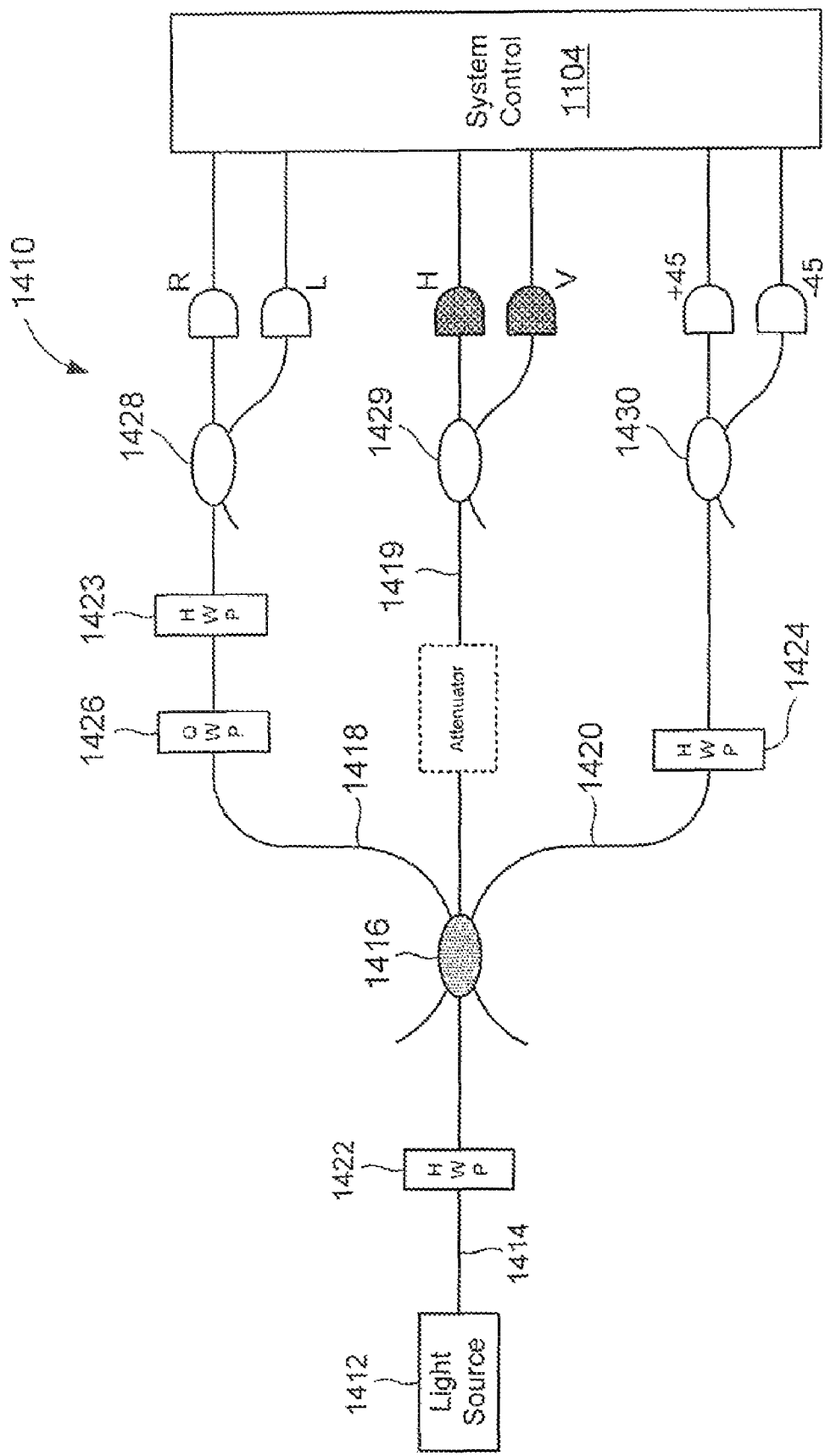

Although the present invention has been described in terms of a particular system embodiment QRBG 1100, it is not intended that the invention be limited to this embodiment. Modifications within the spirit of the invention will be apparent to those skilled in the art. For example, in another embodiment of the present invention, those skilled in the art would recognize that rather than using a single 3-way junction 1140, shown in FIG. 11, two Y-junctions can be used to split the pulse $|\alpha_{45}\rangle$. As shown in FIG. 14A, Y-junctions 1402 and 1404 split the pulse $|\alpha_{45}\rangle$ into the pulses $|\alpha_{45}\rangle_A$, $|\alpha_{45}\rangle_B$, and $|\alpha_{45}\rangle_C$. In another embodiment of the present invention, rather than using the laser diode 1106, shown in FIG. 11, to generate a pulse, a light-emitting diode ("LED") 1406 and a polarizing beamsplitter 1408 can be used to generate the pulse $|\alpha_{45}\rangle$, as shown in FIG. 14B. In other embodiments of the present invention, rather than using the transmission layer 1102 with ridge waveguides 1108, 1110-1112 to direct the propagation of pulses, the transmission layer 1102 can be replaced by a photonic crystal with corresponding photonic crystal waveguides that can be used to direct the propagation of pulses. In other embodiments of the present invention, the transmission layer 1102 and ridge waveguides 1108, 1110-1112 can be replaced with optical fibers, the polarization rotators 1114-1118 can be replaced with half- and quarter-wave plates, and the polarizing beamsplitters can be replaced with polarization couplers. For example, FIG. 14C illustrates a schematic representation of a QRBG 1410 that represents an embodiment of the present invention. The QRBG 1410 comprises a laser diode 1412, an optical fiber 1414, a waveguide coupler 1416 that splits the optical fiber 1414 into three optical fibers 1418-1420. The QRBG 1410 also includes three half-wave plates 1422-1424, a quarter-wave plate 1426, and three polarizing couplers 1428-1430. In another embodiment of the present invention, the laser diode 1412 can be replaced with an LED and a half-wave plate.

II. Tomographic Analysis

The detection events at the avalanche photodiodes 1132 and 1133 can be recorded by the system control 1104 are used construct a sequence of random bits. The system control 1104 may record four different detection events. For example, when a pulse is detected by the avalanche photodiode 1132, the binary number "1" is recorded, and when a pulse is detected by the avalanche photodiode 1133, the binary number "0" is recorded. When no pulse is detected at either of the avalance photodiodes 1132 and 1133, "No Pulse" is recorded, and when pulses are detected at both of the avalance photodiodes 1132 and 1133, an "Error" is recorded. Table I summarizes the four kinds of events that may be recorded by the system control 1104 for each pulse $|\alpha_{45}\rangle$ output from the state generator 1002, shown in FIG. 10:

TABLE II

| Detection at | Photon State | Information Recorded |
|---|---|---|
| APD 1132 | $|H\rangle$ | "1" |
| APD 1133 | $|V\rangle$ | "0" |
| APD 1132 and APD 1133 | $|H\rangle$ and $|V\rangle$ | Error |
| No pulse detected | $|0\rangle$ | No Pulse |

Figure 15:
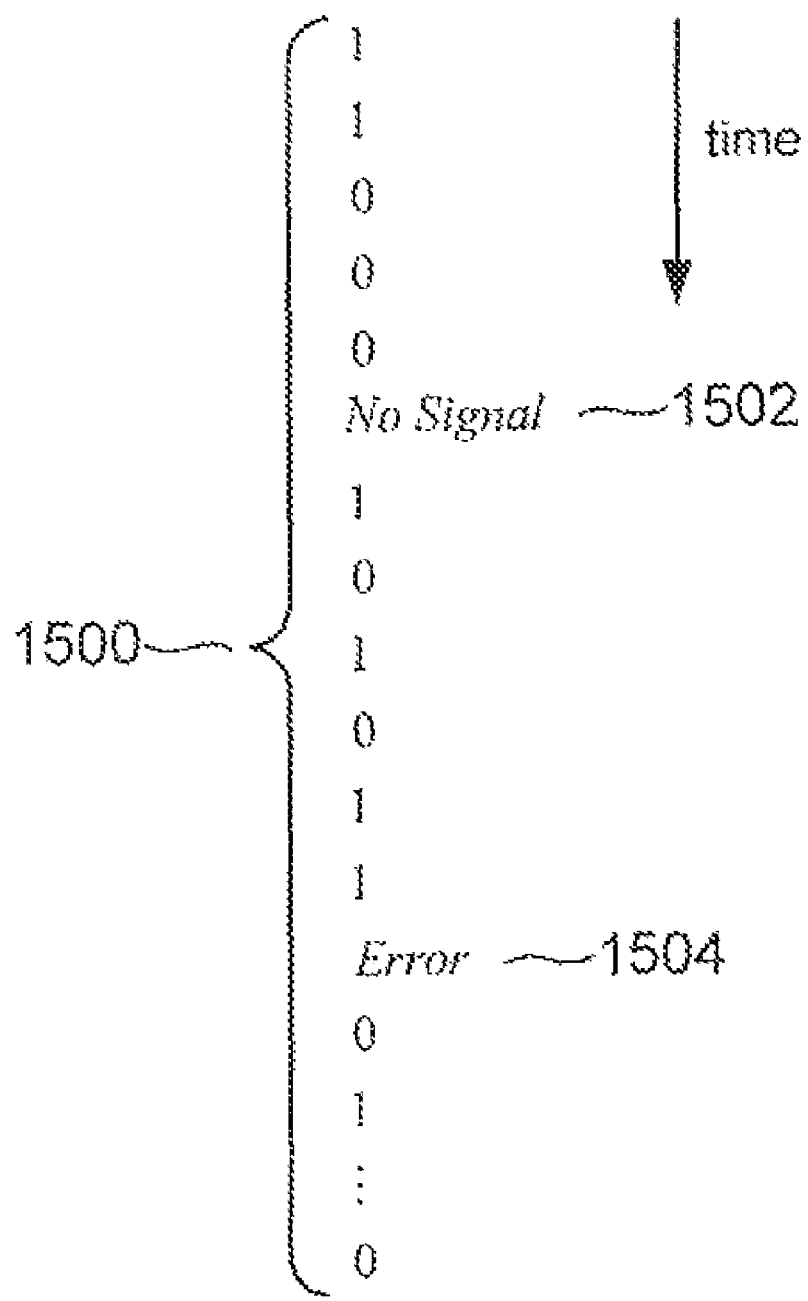
FIG. 15 illustrates a hypothetical sequence of raw counts that may be recorded by a system control that represents an embodiment of the present invention

Each detection event recorded by the system control 1104 is called a "raw count." FIG. 15 illustrates a hypothetical sequence of N raw counts 1500 recorded by the system control 1104 for a sequence of N pulses $|\alpha_{45}\rangle$ generated by the laser diode 1106 that represents an embodiment of the present invention. The sequence of N raw counts 1500 includes sequences of binary numbers "0" and "1" separated by a raw count "No Pulse" 1502 and a raw count "Error" 1504. Method embodiments of the present invention, described below with reference to FIGS. 17-22, are directed to using the polarization states $|\alpha_R\rangle_A$, $|\alpha_L\rangle_A$, $|\alpha_{45}\rangle_C$, and $|\alpha_{-45}\rangle_C$ to sift the sequence of N raw counts and obtain the sequence of random bits $\vec{s}_m$. Note that detection of pulses at the detectors 1128-1133 are synchronized.

Figure 16:
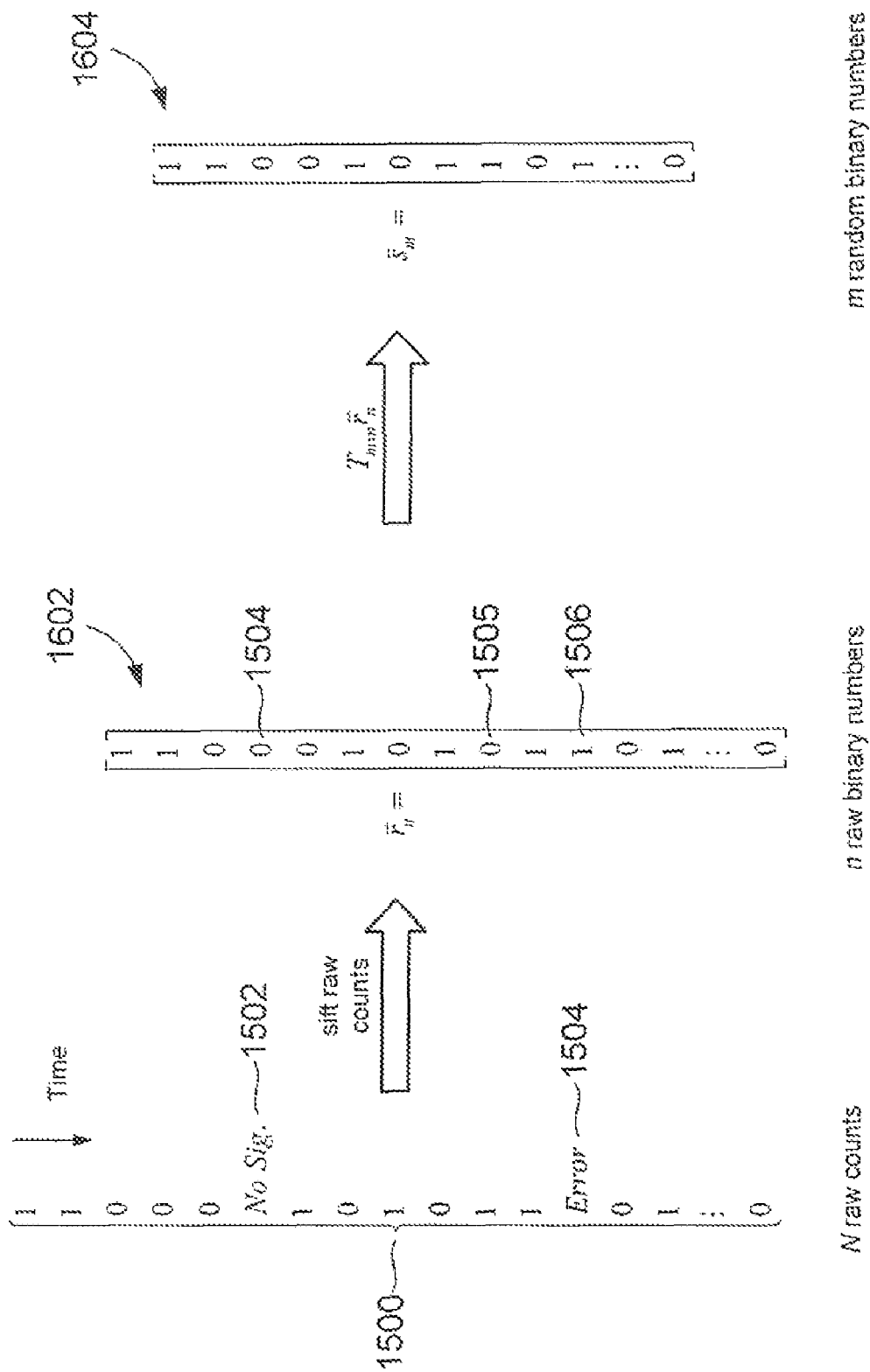
FIG. 16 illustrates generating a sequence of random bits from a sequence of raw counts that represents an embodiment of the present invention.

FIG. 16 illustrates generating a hypothetical sequence of random bits from a sequence of raw counts that have been generated by the QRBGs 1100 shown in FIG. 11. The QRBG 1100 generates the sequence of N raw counts 1500, shown in FIG. 15. The "No Pulse" and "Error" detection events recorded in the sequence of N raw counts 1500, such as "No Pulse" 1502 and the "Error" 1504, are removed from to produce a raw sequence of n bits represented by a column vector $\vec{r}_n$ 1602, where n<N. The raw sequence 1602 includes a number of hypothetically biased bits, such as hypothetically biased bits 1504-1506. The bias may be the result of hardware imperfections or, in a worst cased scenario, the state generator 1002, such as the laser diode 1106, is controlled by a entity that wishes to generate a biased sequence of bits. Quantum tomographic analysis methods of the present invention include constructing an m×n Toeplitz matrix $T_{m \times n}$, which is used to sift out the biased bits in the raw sequence $\vec{r}_n$ 1602 using matrix multiplication as follows:

$$\vec{s}_m = T_{m \times n} \vec{r}_n$$

where m<n<N. The sequence of random bits $\vec{s}_m$ is represented by a column vector 1608.

"Cryptographic Hardware and Embedded Systems CHES 2003," by C. D. Walter et al. (Eds.) pp. 166-180, Springer-Verlag (2003), and in particular the chapter "True Random Number Generators Secure in a Changing Environment," by Barak et al., provides a mathematical definition of the Toeplitz matrix. The following discussion provides the insight needed to construct the Toeplitz matrix in accordance with the Barak et al. reference.

Figure 17:
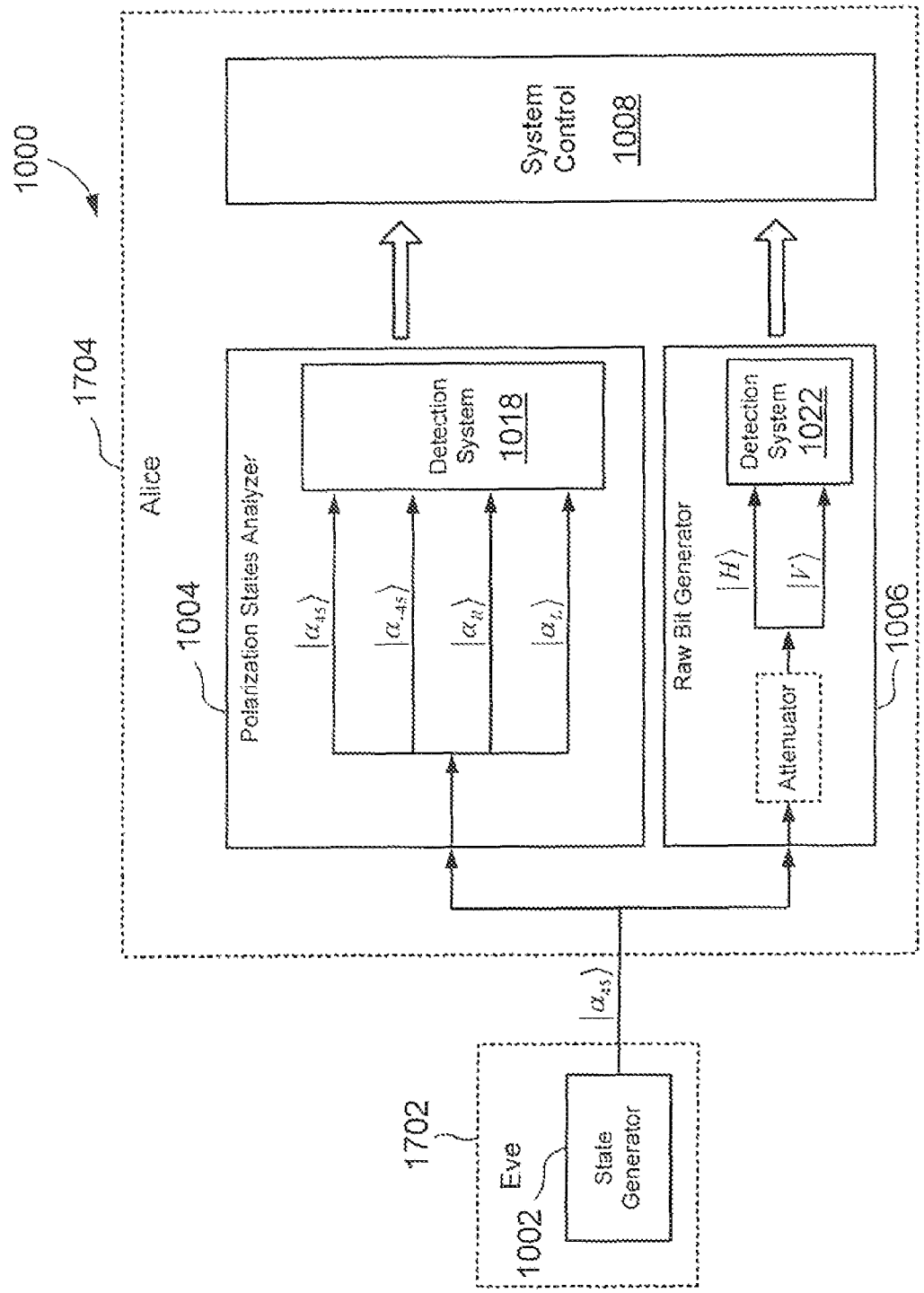
FIG. 17 illustrates the quantum random number generator shown in FIG. 10 for an adversarial scenario.

In order to emphasize that the methods of the present invention can be used to generate a sequence of true random numbers in spite of biases in the states output from the state generator 1002, the quantum mechanical-based method embodiments of the present invention are described below with reference to generating a sequence of random bits $\vec{s}_m$ using an adversarial scenario. FIG. 17 illustrates the QRBG 1000 described above with reference to FIG. 10 under an adversarial scenario. In the adversarial scenario, the state generator 1002 falls under the control of an adversary, called "Eve" 1702, and the rest of the QRBG 1000 is under the control of a user, called "Alice" 1704. Eve wants to generate a sequence of bits that appears random to Alice 1704, and is partially known to Eve. Because Alice generates the random bits using only the states $|H\rangle$ and $|V\rangle$, the following analysis is restricted to a subspace spanned by the basis $\{|H\rangle, |V\rangle\}$. Therefore it assumed that Eve generates coherent states of the form:

$$|\psi\rangle = c|H\rangle + d|V\rangle$$

where
$|c|^2 + |d|^2 = 1$,
$0 \leq |c|^2 \leq 1$, and
$0 \leq |d|^2 \leq 1$

Eve is assumed to have no knowledge of the measurements Alice applies to photons in the state $|\psi\rangle$. When Eve prepares pulses, all in the same pure state $|\psi\rangle$, Alice can perform a measurement on each pulse and obtain the density matrix:

$$\hat{\rho} = \begin{bmatrix} |c|^2 & cd^* \\ c^*d & |d|^2 \end{bmatrix}$$

The density matrix $\hat{\rho}$ represents the maximum amount of information that Alice can obtain about the state of the pulses Alice is provided by Eve. Alice can determine the elements of the density matrix $\hat{\rho}$ by performing tomographic analysis on pulses provided by Eve. The tomographic analysis, also called "self-authentication," is used to evaluate randomness of a sequence of bits. Tomographic analysis of quantum states is well-known in the art and is described, for example, in a reference by James et al., "Measurement of Qubits," Phys. Rev. A, Vol. 64, 052312. Tomographic analysis is used to identify the states $|\psi\rangle$ prepared by Eve. As described in the James et al. reference, in order to perform tomographic analysis on a b-qubit system, $(4^b - 1)$ different expectation values are needed to determine the associated density matrix $\hat{\rho}$. As a result, numerous copies of identical states are needed for measurements of the expectation values. The $(4^b - 1)$ different expectation values and the normalization requirement for the states ideally generates $4^b$ independent restrictions on $2^b$ complex coefficients of a general b-qubit system, permitting an analytic solution for the density matrix $\hat{\rho}$ and $2^b$ complex coefficients defining the measured state.

Eve may also attempt to bias a sequence in a way that is known to her but appears random to Alice by transmitting pulses in a statistical mixture of the states $|\psi_i\rangle(=c_i|H\rangle + d_i|V\rangle)$, the state of each pulse having an associated probability $p_i$. Alice performs tomographic analysis to determine the density matrix operator:

$$\hat{\rho} = \sum_i p_i |\psi_i\rangle\langle\psi_i|$$

and the associated density matrix:

$$\hat{\rho} = \begin{bmatrix} \sum_i p_i |c_i|^2 & \sum_i p_i c_i d_i^* \\ \sum_i p_i c_i^* d_i & \sum_i p_i |d_i|^2 \end{bmatrix}$$

where $$\sum_i p_i |c_i|^2 = Pr_H$$

is the probability of measuring the state $|H\rangle$; and $$\sum_i p_i |d_i|^2 = Pr_V$$

is the probability of measuring the state $|V\rangle$.

The density matrix operator and the density matrix are compositions of pure state density matrix operators and associated density matrices. Note that although Eve prepares and knows the state $|\psi_i\rangle$ of each pulse that Alice is measuring each time, Eve cannot control the outcome of Alice's measurement on a state $|\psi_i\rangle$, because the outcome of each measurement performed by Alice is governed by the laws of quantum mechanics.

Alice performs the tomographic analysis to determine the density matrix $\hat{\rho}$ and to evaluate the quality of a source of randomness. The quality of a source of randomness can be strictly evaluated using a minimum entropy ("min-entropy") function defined as follows:

$$H_{min}(X) \equiv -\log_2\left(\max_{x \in X} Pr(x)\right)$$

where
X is a random variable;
Pr(x) is the probability of a event x; and $$\max_{x \in X} Pr(x)$$

means the maximum probability Pr(x) over every event x in X.

In other words, the min-entropy can be thought of as a measure of the amount of randomness in a probability distribution ranging from "0" to "1," where "0" means an event occurs with certainty or not at all, and "1" means whether or not an event occurs is truly random.

Figure 18:
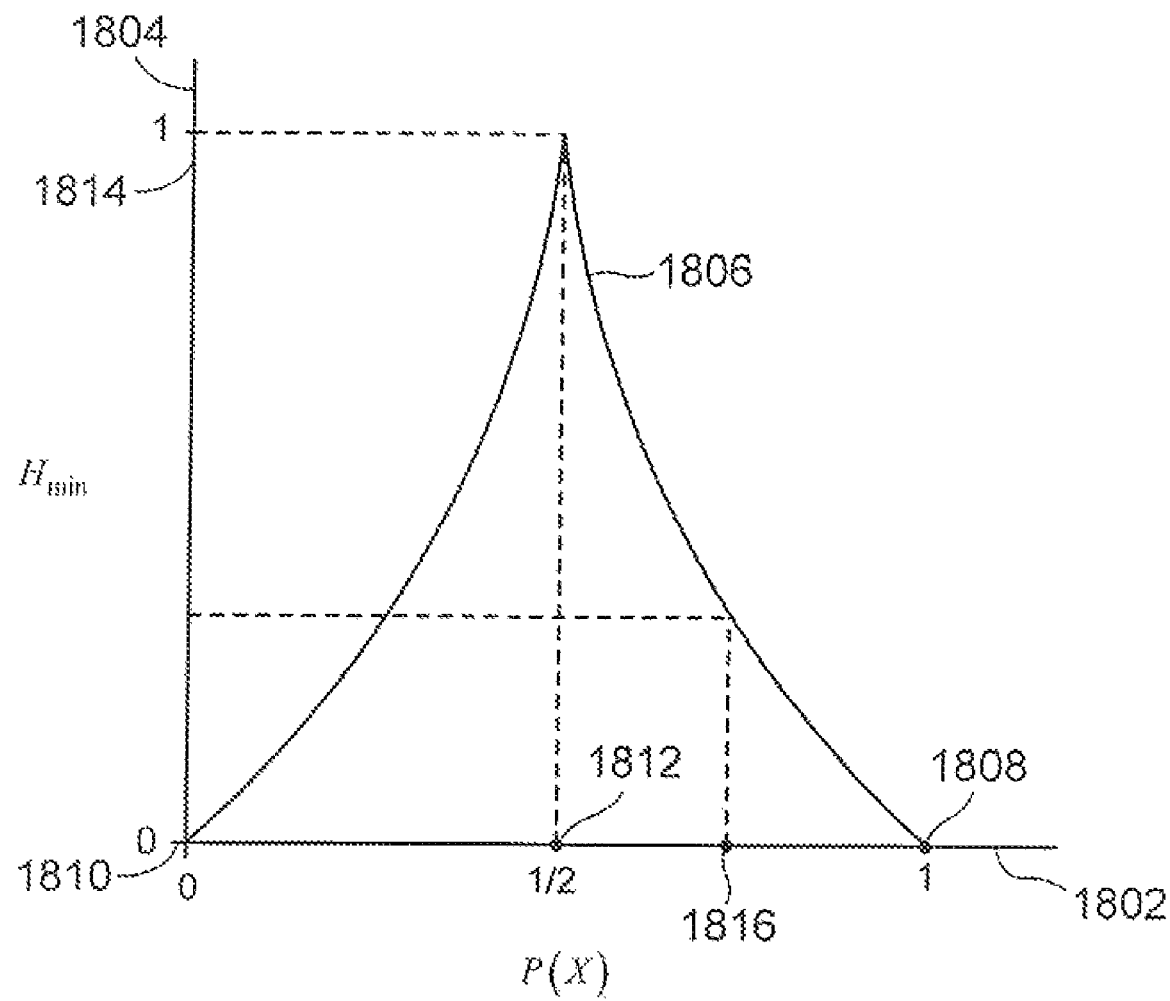
FIG. 18 is a plot of a min-entropy that represents an embodiment of the present invention.

FIG. 18 is a plot of the min-entropy that represents an embodiment of the present invention. In FIG. 18, horizontal axis 1802 corresponds to the probability Pr(x) of an event x, vertical axis 1804 represents values of the min-entropy, and curve 1806 represents the min-entropy $H_{min}(X)$. When the maximum probability Pr(x) of the event x occurring is "1" 1808, the min-entropy is "0" 1810. In other words, the event x occurs with certainty and is completely deterministic. Note that an event with a probability Pr(x) equal to "0" also has a min-entropy of "0" 1810 and means that the event does not occur. When the maximum probability Pr(x) of the event x occurring is "½" 1812, the min-entropy is "1" 1814. In other words, the event x occurs without bias and corresponds to a truly random event. When the maximum probability of the event x occurring is greater than ½, the min-entropy is between "0" and "1" and is said to be a biased event, such as such as the point 1816, which corresponds to the min-entropy 1818.

In order to demonstrate use of the min-entropy, the following discussion describes how the elements of the density matrix are used in the definition of the min-entropy for three different kinds of ensembles of states generated by Eve. When Alice performs tomographic analysis on a single pulse in a pure state $|\psi\rangle$ provide by Eve, the random variable X is distributed over the set $\{0, 1\}$, and the min-entropy is:

$$H_{Min}(|\psi\rangle\langle\psi|) = -\log_2(\max(Pr_H(|\psi\rangle), Pr_V(|\psi\rangle)))$$

where
$Pr_H(|\psi\rangle) = |c|^2 = \langle H|\psi\rangle^2$, and
$Pr_V(|\psi\rangle) = |d|^2 = |\langle V|\psi\rangle^2$ The min-entropy can be extended to the case when Alice performs tomographic analysis on n pulses, all in the same pure state $|\psi\rangle$, provided by Eve. The random variable X is distributed over the set $\{0, 1\}^n$, and the min-entropy is:

$$H_{Min}((|\psi\rangle\langle\psi|)^n) = -n \log_2(\max(Pr_H(|\psi\rangle), Pr_V(|\psi\rangle)))$$

Finally, when Alice performs tomographic analysis on n pulses in a statistical mixture of pure states $|\psi_i\rangle$ provided by Eve, the min-entropy is:

$$H_{Min}\left(\left(\sum_i p_i |\psi_i\rangle\langle\psi_i|\right)^n\right) = -n \sum_i p_i \log_2(\max(Pr_H(|\psi_i\rangle), Pr_V(|\psi_i\rangle)))$$

where $$Pr_H(|\psi_i\rangle) = \sum_i p_i |c_i|^2, \text{ and}$$

$$Pr_V(|\psi_i\rangle) = \sum_i p_i |d_i|^2$$

Alice does not know the decomposition of the states comprising the pulse Eve is providing. Alice only has access to the density matrix $\hat{\rho}$ that she generates during tomographic analysis. In order to obtain an extension of the min-entropy to arbitrary states, the min-entropy associated with pulses is defined as the minimum min-entropy over all the possible decompositions of the density matrix $\hat{\rho}$. Using such a definition of the minimum min-entropy places an upper bound on the amount of information Eve can obtain about Alice's sequence.

Note that as long as the min-entropy $H_{min}$ is not equal zero, Eve does not have complete control over the sequences of bits produced by the QRBGs described above. In other words, as long as the min-entropy is greater than zero, there exists some number m of random bits within a sequence of n bits generated by the QRBGs, where m<n.

In order to facilitate the tomographic analysis, the min-entropy $H_{Min}(\hat{\rho})$ is re-characterized as a function of the Stokes parameters. First, the 2×2 density matrix $\hat{\rho}$ associated with a statistical mixture of states $|\psi_i\rangle$ above can be rewritten in terms of the Stokes parameters $(S_0, S_1, S_2, S_3)$ as follows:

$$\hat{\rho}_S = \frac{1}{2} \sum_{i=0}^{3} \frac{S_i}{S_0} \sigma_i$$

$$= \frac{1}{2} \begin{bmatrix} 1 + S_1 & S_2 + iS_3 \\ S_2 - iS_3 & 1 - S_1 \end{bmatrix}$$

where
subscript "S" identifies the density matrix rewritten in terms of the Stokes parameters;
the Stokes parameter $S_0$ is normalized to "1"; and
$\sigma_1$, $\sigma_2$, and $\sigma_3$ are the well-known Pauli matrices in the $\{|R\rangle, |L\rangle\}$ basis.

The Stokes parameters of the density matrix $\hat{\rho}_S$ can be determined based on the detection events as follows. In the device embodiments of the present invention described above with reference to FIGS. 11-14, Alice use the avalanche photodiodes 1132 and 1133 to detect single photons. The system control 1104 receives signals from the avalanche photodiodes 1132 and 1133 and calculates the average number of horizontally polarized photons, $\langle H \rangle$, and the average number of vertically polarized photons, $\langle V \rangle$. Alice uses the p-i-n photodetectors 1128-1131 to detect the intensities of electromagnetic radiation $I(\alpha_{45})$, $I(\alpha_{-45})$, $I(\alpha_R)$, and $I(\alpha_L)$. The system control 1104 receives signals corresponding to the intensities and calculates the corresponding average intensities $\langle \alpha_{45} \rangle$, $\langle \alpha_{-45} \rangle$, $\langle \alpha_R \rangle$, and $\langle \alpha_L \rangle$. The normalized Stokes parameters can then be determined by:

$$S_1 = \frac{\langle H \rangle - \langle V \rangle}{\langle H \rangle + \langle V \rangle},$$

$$S_2 = \frac{\langle \alpha_{45} \rangle - \langle \alpha_{-45} \rangle}{\langle \alpha_{45} \rangle + \langle \alpha_{-45} \rangle}, \text{ and}$$

$$S_3 = \frac{\langle \alpha_R \rangle - \langle \alpha_L \rangle}{\langle \alpha_R \rangle + \langle \alpha_L \rangle}$$

By defining the following real-valued function for all density matrices $\hat{\rho}_S$:

$$f(\hat{\rho}_S) = -\log_2\left(\frac{1 + \sqrt{1 - |S_1 + iS_2|^2}}{2}\right)$$

the following theorem can be stated:

Theorem. The min-entropy of a system described by the density matrix $\hat{\rho}_S$ is $H_{Min}(\hat{\rho}_S) = f(\hat{\rho}_S)$ Proof of the Theorem is provided below in an appendix. The Theorem demonstrates that a measurement of the density matrix of the states used to generate a sequence of bits has an upper bound on the amount of information an adversary, such as Eve, can obtain. Barak et al. shows that given a sequence of n bits with a min-entropy $H_{min}$, one can extract m random bits from the raw sequence of bits, where m<n. The m random bits are distributed according to a distribution which is arbitrarily close to a uniform distribution of bits.

Figure 19:
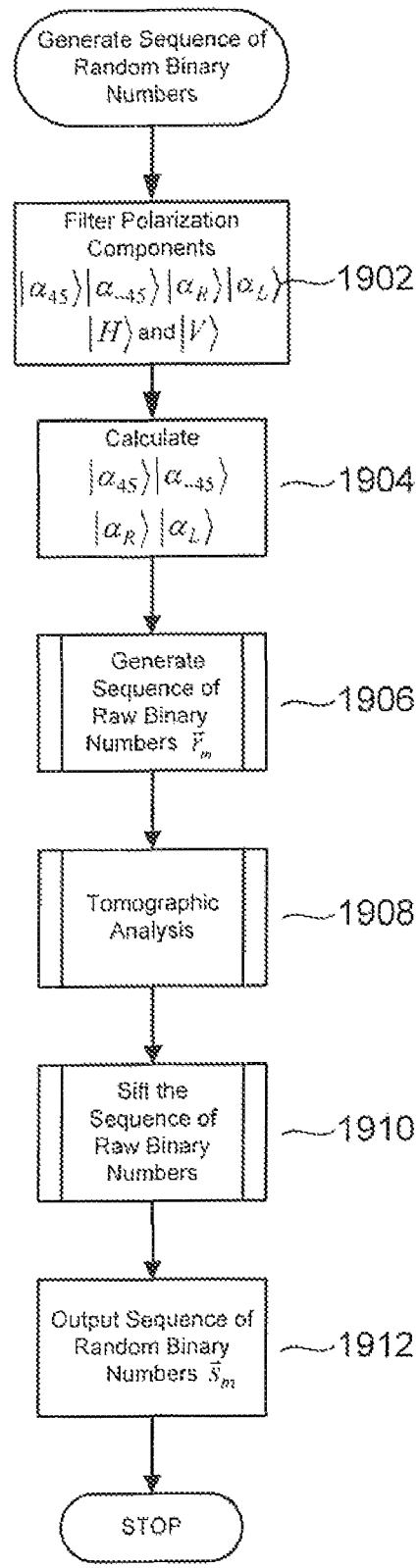
FIG. 19 shows a control-flow diagram that represents one of many embodiments of the present invention for generating sequences of random bits.

FIG. 19 shows a control-flow diagram that represents one of many embodiments of the present invention for generating sequences of random bits. In step 1902, the QRBGs 1100 described above are employed N times to filter the polarization components $|\alpha_{45}\rangle, |\alpha_{-45}\rangle, |\alpha_R\rangle$, and $|\alpha_L\rangle$, and generate and filter single photons in the polarization states $|H\rangle$ and $|V\rangle$. In step 1904, based on the detection results obtained in step 1902, the system control 1104 calculates the average intensities $\langle \alpha_{45} \rangle$, $\langle \alpha_{-45} \rangle$, $\langle \alpha_R \rangle$, and $\langle \alpha_L \rangle$, which are used to determine the Stokes parameters $S_2$ and $S_3$, as described above. In step 1906, the routine "generate a sequence of raw bits" is called, which generates a raw sequence of n random bits $\vec{r}_n$ from a sequence of N raw counts, as described above with reference to FIG. 16. In step 1908, the routine "tomographic analysis" is called. The routine tomographic analysis is a method for determining a density matrix $\hat{\rho}_S$ and the min-entropy $H_{min}(\hat{\rho}_S)$, as described above. In step 1910, the routine "sift the sequence of raw bits" is called, which employs the min-entropy $H_{min}$, to remove bias from the sequence $\vec{r}_n$ and produce a smaller sequence of m random bits $\vec{s}_m$. In step 1912, the sequence of random bits $\vec{s}_m$ is output.

Figure 20:
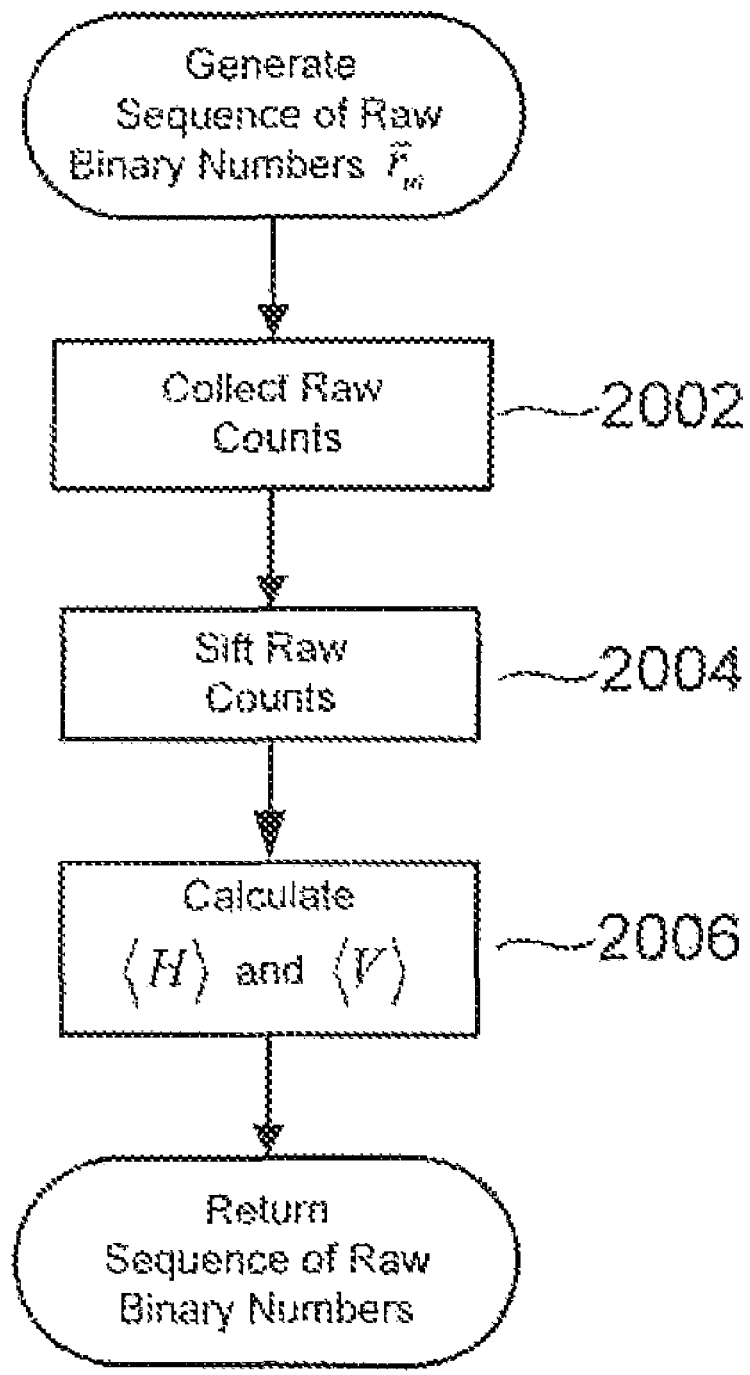
FIG. 20 shows a control-flow diagram for the routine "generate sequence of raw binary numbers $\vec{r}_n$" called in step 1906 of FIG. 19 and represents one of many embodiments of the present invention.

FIG. 20 shows a control-flow diagram for the routine "generate a sequence of raw bits" called in step 1906 of FIG. 19 and represents one of many embodiments of the present invention. In step 2002, N raw counts are collected as described above with reference to FIG. 15. In step 2004, the raw count is sifted by discarding the raw counts that correspond to either "No Pulse" or "Errors" leaving a raw sequence of n random bits, as described above with reference to FIG. 15. In step 2006, the system control 1104 averages of the raw counts corresponding to the states $|H\rangle$ and $|V\rangle$ in order to obtain determine the averages $\langle H \rangle$ and $\langle V \rangle$, which are subsequently used to determine the Stokes parameter $S_1$, as described above.

Figure 21:
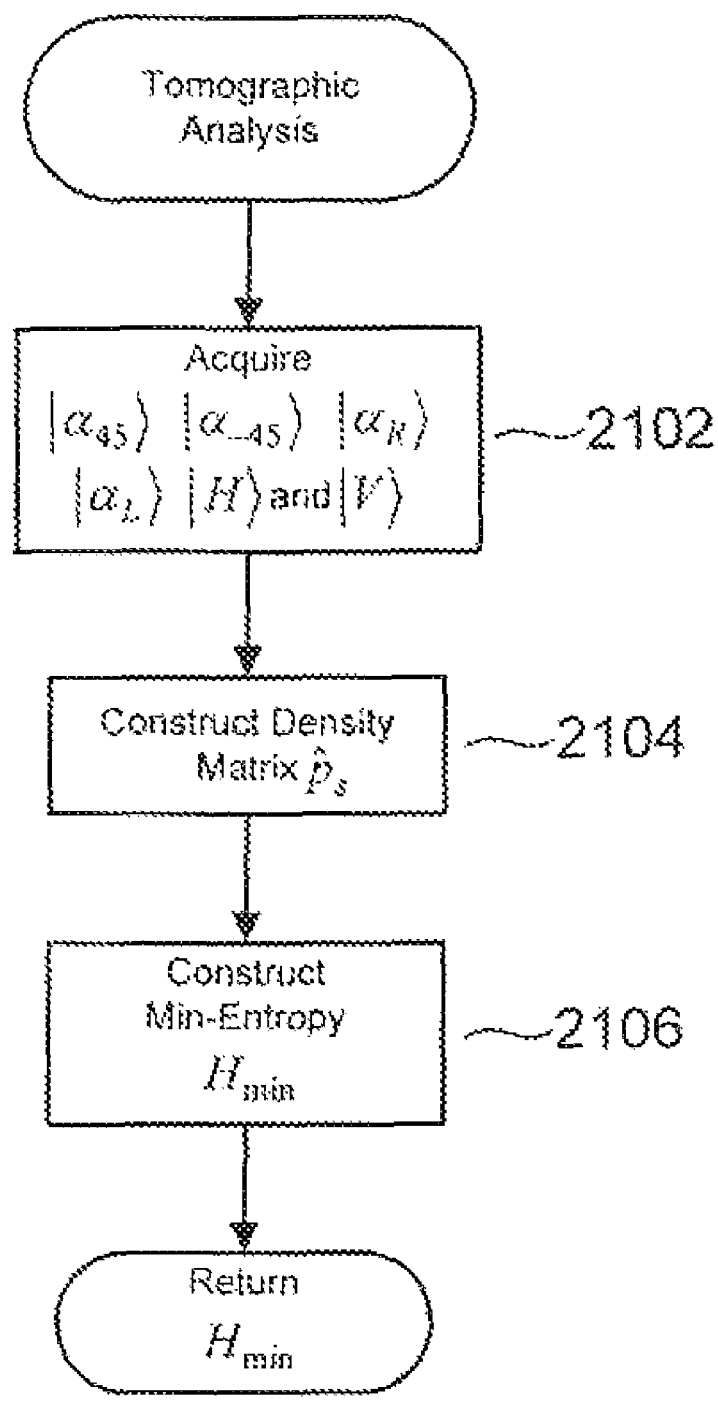
FIG. 21 shows a control-flow diagram for the routine "tomographic analysis" called in step 1908 of FIG. 19 and represents one of many embodiments of the present invention.

FIG. 21 shows a control-flow diagram for the routine "tomographic analysis" called in step 1908 of FIG. 19 and represents one of many embodiments of the present invention. In step 2102, the averages $\langle \alpha_{45} \rangle$, $\langle \alpha_{-45} \rangle$, $\langle \alpha_R \rangle$, $\langle \alpha_L \rangle$, obtained in step 1904 of FIG. 19, and the averages $\langle H \rangle$ and $\langle V \rangle$ obtained in step 2006 of FIG. 20, are acquired. In step 2104, the density matrix $\hat{\rho}_S$ is constructed as described above. In step 2106, the density matrix $\hat{\rho}_S$ is used to construct the min-entropy $H_{min}(\hat{\rho}_S)$.

Figure 22:
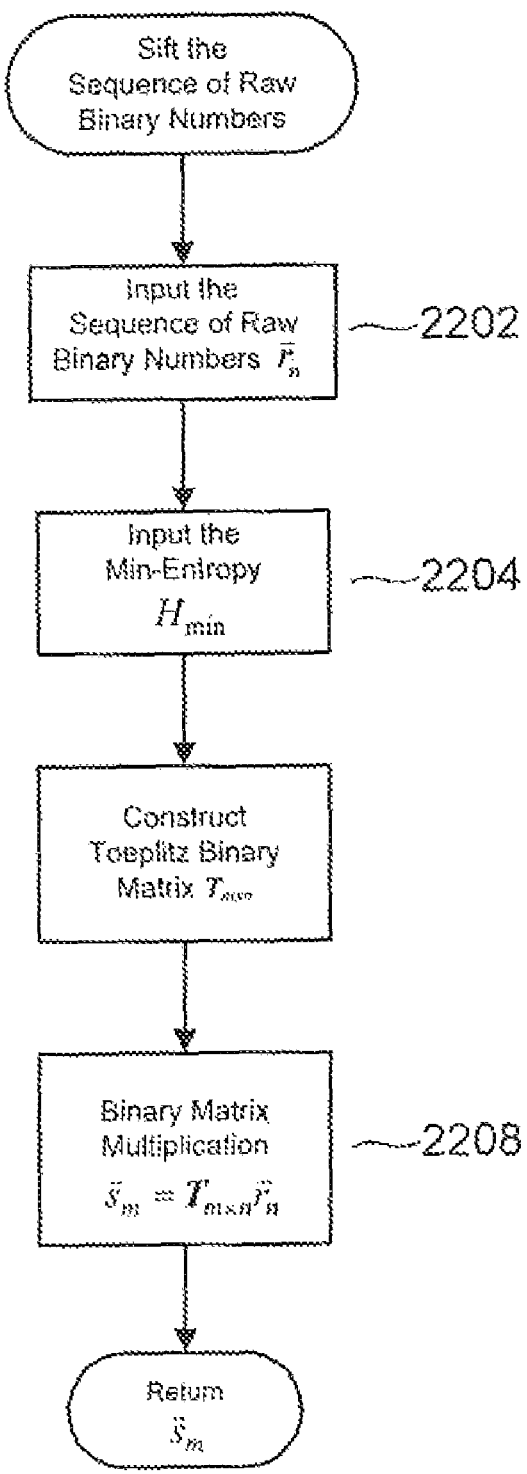
FIG. 22 is a control-flow diagram for the routine "sift the sequence of raw binary numbers" called in step 1910 of FIG. 19 and represents one of many embodiments of the present invention.

FIG. 22 is a control-flow diagram for the routine "sift the sequence of raw bits" called in step 1910 of FIG. 19 and represents one of many embodiments of the present invention. In step 2202, the raw sequence of random bits $\vec{r}_n$ generated in the routine "generate sequence of raw binary numbers" in FIG. 20 is input. In step 2204, the min-entropy $H_{Min}(\hat{\rho}_S)$ generated in the routine "tomographic analysis" of FIG. 21 is input. In step 2206, the Toeplitz matrix $T_{m \times n}$ is constructed, as described in the Barak et al. reference. In step 2208, the sequence $\vec{s}_m$ is determined and output in step, as described above with reference to FIG. 16.

Based on the Barak et al. reference, the maximum number of bits that can be extracted from a raw sequence of n ransom bits is:

$$m = kn - 4\log_2\left(\frac{1}{\varepsilon}\right) - 2$$

where $\in$ is a statistical distance between a distribution of m bits and a uniform distribution. The statistical distance is defined mathematically as:

$$\varepsilon = \frac{1}{2}\sum_a |Pr(X = a) - Pr(W = a)|$$

where X and W denote different distributions. The yield Y is the fraction of random bits m/n that can be obtained from a raw sequence of random bits.

In other embodiments of the present invention, those skilled in the art would recognize that other optical quantum systems, states other than coherent states, such as thermal states, can be used. For example, the state generator 1002 may be a light bulb. In other embodiment of the present invention, polarization states other than the polarization states $|H\rangle, |V\rangle, |\alpha_{45}\rangle, |\alpha_{-45}\rangle, |\alpha_R\rangle$, and $|\alpha_L\rangle$ can be used, such as the polarization states described in the James et al. reference.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

APPENDIX

Theorem. The min-entropy of a system described by a density matrix $\hat{\rho}_S$ is:

$$H_{Min}(\hat{\rho}_S) = f(\hat{\rho}_S)$$

In order to demonstrate a proof of the Theorem, proofs of the followings three Lemmas are demonstrated.

Lemma 1. For each pure state $|\psi\rangle$:

$$H_{Min}(|\psi\rangle\langle\psi|) = f(|\psi\rangle\langle\psi|)$$

Proof of Lemma 1 is demonstrated by showing that:

$$\max(Pr_H, Pr_V) = \frac{1 + \sqrt{1 - |S_1 + iS_2|^2}}{2}$$

for the cases $Pr_H > 1/2$, $Pr_H < 1/2$, and $Pr_V = 1/2$. First, because $|\psi\rangle$ is a pure state, the associated Stokes parameters correspond to a point on the surface of a Poincaré sphere, as described above with reference to FIG. 10, and, in particular, the parameters $S_1$ and $S_2$ are given by:

$$S_1 = \sqrt{4P_H(1 - P_H)} \cos 2\psi$$

$$S_2 = \sqrt{4P_H(1 - P_H)} \sin 2\psi$$

Substituting $S_1$ and $S_2$ into the right-hand side gives:

$$\frac{1 + \sqrt{1 - |S_1 + iS_2|^2}}{2} = \frac{1 + \sqrt{1 - 4Pr_H(1 - Pr_H)}}{2}$$

$$= \frac{1}{2} + \left|\frac{1}{2} - Pr_H\right|$$

When $Pr_H > 1/2$ the left-hand side reduces to $$\max(Pr_H, 1 - Pr_H) = Pr_H,$$

and the right-hand side reduces to $$\frac{1}{2} + \left|\frac{1}{2} - Pr_H\right| = \frac{1}{2} + Pr_H - \frac{1}{2} = Pr_H$$

When $Pr_H < 1/2$ the left-hand side reduces to $$\max(Pr_H, 1 - Pr_H) = 1 - Pr_H$$

and the right-hand side reduces to $$\frac{1}{2} + \left|\frac{1}{2} - Pr_H\right| = \frac{1}{2} + \frac{1}{2} - Pr_H = 1 - Pr_H$$

Finally, for the trivial case, when $Pr_{HV} = 1/2$, both the left and right hand side reduce to $1/2$.

Lemma 2. Two pure states $|\psi_1\rangle$ and $|\psi_2\rangle$ that are represented by the density matrices:

$$\hat{\rho}_1 = \frac{1}{2}\begin{bmatrix} 1 + S_3' & S_1 - iS_2 \\ S_1 + iS_2 & 1 - S_3' \end{bmatrix}, \text{ and}$$

$$\hat{\rho}_2 = \frac{1}{2}\begin{bmatrix} 1 - S_3' & S_1 - iS_2 \\ S_1 + iS_2 & 1 + S_3' \end{bmatrix}$$

with $S_3' = \sqrt{1 - S_1^2 - S_2^2}$ are a decomposition of the density matrix $$\hat{\rho}_S = \frac{1}{2}\begin{bmatrix} 1 + S_3 & S_1 - iS_2 \\ S_1 + iS_2 & 1 - S_3 \end{bmatrix}$$

Proof of Lemma 2: The density matrices represent pure states that are a decomposition of $\hat{\rho}_S$ with diagorial matrix elements that satisfy:

$$p_1 + p_2 = 1, \text{ and}$$

$$p_1 - p_2 = \frac{S_3}{S_3'}$$

Based on Lemma 1, since both $|\psi_1\rangle$ and $|\psi_2\rangle$ are pure states:

$$H_{Min}(|\psi_1\rangle\langle\psi_1|) = f(\hat{\rho}_S) = H_{Min}(|\psi_2\rangle\langle\psi_2|)$$

In addition, based on the equation for $$H_{Min}\left(\left(\sum_i p_i |\psi_i\rangle\langle\psi_i|\right)^n\right)$$

above, with $n=1$:

$$H_{Min}(p_1|\psi_1\rangle\langle\psi_1| + p_2|\psi_2\rangle\langle\psi_2|) =$$
$$p_1 H_{Min}(|\psi_1\rangle\langle\psi_1|) + p_2 H_{Min}(|\psi_2\rangle\langle\psi_2|) = (p_1 + p_2) f(\hat{\rho}_S) = f(\hat{\rho}_S)$$

Lemma 3. The function $f(\hat{\rho}_S)$ is a convex function of the Stokes parameters $S_1, S_2, S_3$ on the Poincaré sphere.

Proof of Lemma 3: The eigenvalues of the Hessian matrix of $f(\hat{\rho}_S)$ are non-negative over the domain $(1/2, 1)$.

Proof of the Theorem. According to properties of a convex function:

$$f(\hat{\rho}_S) \le \sum_i p_i f(|\psi_i\rangle\langle\psi_i|)$$

for each decomposition of $\hat{\rho}_S$. Substituting the result of Lemma 1 and using equation $$H_{Min}\left(\left(\sum_i p_i |\psi_i\rangle\langle\psi_i|\right)^n\right)$$

above gives:

$$f(\hat{\rho}_S) \le H_{Min}\left(\sum_i p_i |\psi_i\rangle\langle\psi_i|\right)$$

Which means that $f(\hat{\rho}_S)$ is a lower bound for the min-entropy of $\hat{\rho}_S$. But according to Lemma 2, there is at least one decomposition of $\hat{\rho}_S$ for which $$f(\hat{\rho}_S) = H_{Min}(\hat{\rho}_S).$$

Therefore, $f(\hat{\rho}_S)$ is equal to the minimum of $H_{Min}$ over all the decompositions of $\hat{\rho}_S$. Q.E.D.

The invention claimed is:

1. A self-authenticating, quantum random bit generator comprising:
   a transmission layer including,
      an electromagnetic radiation source coupled to a waveguide branching into a first waveguide, a second waveguide, and a third waveguide, the electromagnetic radiation source configured to generate pulses of electromagnetic radiation in a first polarization state;
      two or more polarization rotators positioned and configured to rotate pulses transmitted in the second waveguide into a second polarization state and rotate pulses transmitted in the third waveguide into a third polarization state; and
   a system control configured to generate a sequence of bits based on polarization basis states of the pulses transmitted in the first waveguide, and tomographically authenticate randomness of the sequence of bits based on polarization basis states of the pulses transmitted in the second and third waveguides.

2. The generator of claim 1 further comprises an attenuator operably coupled to the first waveguide and configured to reduce the energy of the pulses transmitted in the first waveguide to at most a single photon.

3. The generator of claim 1 further comprises a first polarizing beamsplitter coupled to the first waveguide, a second polarizing beamsplitter coupled to the second waveguide, and a third polarizing beamspitter coupled to the third waveguide.

4. The generator of claim 3 wherein the first, second, and third polarizing beamsplitters split each pulse into two polarization basis states.

5. The generator of claim 1 wherein the electromagnetic radiation source further comprises one of:
   a diode laser; and
   a light-emitting diode coupled to a waveguide polarizer and a polarization rotator.

6. The generator of claim 1 wherein each polarization rotator further comprise one of:
   two or more polarization rotators;
   a half-wave plate; and
   a quarter-wave plate.

7. The generator of claim 1 wherein the system control further comprises:
   a pair of avalanche photodiodes configured to detect photons transmitted in the first waveguide;
   a first pair of p-i-n photodetectors configured to detect pulses transmitted in the second waveguide; and
   a second pair of p-i-n photodetectors configured to detect pulses transmitted in the third waveguide.

8. The generator of claim 1 wherein the system control further comprises detectors configured to detect polarization basis states of the pulses transmitting in the first, second, and third waveguides.

9. The generator of claim 1 wherein the waveguides further comprise one of
   ridge waveguides;
   waveguides in a photonic crystal; and
   optical fibers.

10. The generator of claim 1 wherein the transmission layer further comprises one of:
    silicon oxynitride; and
    an optical polymer.

11. An optoelectronic chip including the self-authenticating quantum random bit generator of claim 1 embedded within a layer of the optoelectronic chip.

12. A method for generating a sequence of random bits, the method comprising:
    generating a sequence of electromagnetic radiation pulses, each pulse in a first polarization state;
    splitting each pulse into a first pulse, a second pulse, and a third pulse, all three pulses in the same first polarization state;
    rotating each second pulse into a second polarization state and each third pulse into a third polarization state using polarization rotators;
    generating a sequence of bits based on detecting one of two polarization basis states of the first pulse; and
    based on the polarization states of the second and third pulses, performing tomographic analysis in order to authenticate the randomness of the sequence of bits.

13. The method of claim 12 further comprising attenuating the first pulse intensity into a single photon.

14. The method of claim 12 further comprising splitting the first pulse into two polarization basis states, the second pulse into two polarization basis states, and the third pulse into two polarization basis states.

15. The method of claim 14 wherein splitting the pulses into two polarization basis states further comprises transmitting each pulse through a polarizing beamsplitter.

16. The method of claim 12 wherein rotating each second pulse into a second polarization state and each third pulse into a third polarization state further comprises transmitting each second pulse through one or more polarizing beamsplitters and transmitting each third pulse through one or more polarizing beamsplitters.

17. The method of claim 12 wherein generating a sequence of bits further comprises assigning a bit "1" to detecting one of the two polarization basis states of the first pulse and assigning a bit "0" to detecting the other of the two polarization basis states of the first pulse.

18. The method of claim 12 wherein performing tomographic analysis further comprises constructing the minimum entropy:

$$H_{Min}(\hat{\rho}_S) \equiv -\log_2\left(\max_{x \in \hat{\rho}_S} Pr(x)\right)$$

where
 $\hat{\rho}_S$ is the density matrix for an ensemble of states $|104_i\rangle = c_i|H\rangle + d_i|V\rangle$ as a function of Stokes parameters;
 Pr(x) is the probability of a event x; and $$\max_{x \in X} Pr(x)$$

means the maximum probability Pr(x) over every event x in X.

19. The method of claim 18 wherein the density matrix further comprises:

$$\hat{\rho}_S = \frac{1}{2}\sum_{i=0}^{3}\frac{S_i}{S_0}\sigma_i$$
$$= \frac{1}{2}\begin{bmatrix} 1+S_3 & S_1 - iS_2 \\ S_1 + iS_2 & 1 - S_3 \end{bmatrix}$$

where
 $(S_0, S_1, S_2, S_3)$ are Stokes parameters;
 the Stokes parameter $S_0$ is normalized to "1"; and
 $\sigma_1$, $\sigma_2$, and $\sigma_3$ are the Pauli matrices.

20. The method of claim 18 wherein performing tomographic analysis further comprises constructing a Toeplitz matrix $T_{m \times n}$ based on the minimum entropy $H_{min}(\hat{\rho}_S)$, where m is the number of random bits, n is the number of raw bits, and m<n.

\* \* \* \* \*

UNITED STATES PATENT AND TRADEMARK OFFICE
CERTIFICATE OF CORRECTION

PATENT NO. : 7,849,122 B2
APPLICATION NO. : 11/787903
DATED : December 7, 2010
INVENTOR(S) : Marco Fiorentino et al.

It is certified that error appears in the above-identified patent and that said Letters Patent is hereby corrected as shown below:

On the title page, in item (73), Assignee, in column 1, line 1, delete "Developmemt" and insert -- Development --, therefor.

In column 35, line 57, in Claim 3, delete "beamspitter" and insert -- beamsplitter --, therefor.

In column 36, line 17, in Claim 9, delete "one of" and insert -- one of: --, therefor.

In column 37, lines 8-9, in Claim 18, delete "$|104_i\rangle = c_i|H\rangle + d_i|V\rangle$" and insert -- $|\psi_i\rangle = c_i|H\rangle + d_i/v\rangle$ --.

Signed and Sealed this
Twenty-ninth Day of March, 2011

David J. Kappos
*Director of the United States Patent and Trademark Office*